US012605852B2

(12) United States Patent (10) Patent No.: US 12,605,852 B2
Cohen et al. (45) Date of Patent: Apr. 21, 2026

(54) TOOL, DEPALLETIZER INCLUDING THE TOOL, AND METHOD FOR DEPALLETIZING MIXED LOAD PRODUCTS

(71) Applicant: Symbotic LLC, Wilmington, MA (US)

(72) Inventors: Richard B. Cohen, Wilmington, MA (US); Christian Mori, Wilmington, MA (US); Simon Gariepy, Wilmington, MA (US); Marc Ducharme, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 18/905,817

(22) Filed: Oct. 3, 2024

(65) Prior Publication Data

US 2025/0114950 A1 Apr. 10, 2025

Related U.S. Application Data

(60) Provisional application No. 63/588,554, filed on Oct. 6, 2023.

(51) Int. Cl.
  B25J 15/00 (2006.01)
  B25J 15/06 (2006.01)
  B65G 59/04 (2006.01)
(52) U.S. Cl.
  CPC ....... B25J 15/0052 (2013.01); B25J 15/0616 (2013.01); B65G 59/04 (2013.01)
(58) Field of Classification Search
  CPC ... B25J 15/0052; B25J 15/0616; B65G 59/04; B65G 61/00
  See application file for complete search history.

(56) References Cited

U.S. PATENT DOCUMENTS

| | | | | |
|---|---|---|---|---|
| 6,652,014 | B2 * | 11/2003 | Schmalz ............. | B25J 15/0616 |
| | | | | 414/737 |
| 8,473,094 | B2 * | 6/2013 | Becker ................ | B65G 47/918 |
| | | | | 414/796 |
| 9,333,649 | B1 * | 5/2016 | Bradski ................. | G06V 20/10 |
| 9,498,887 | B1 * | 11/2016 | Zevenbergen ....... | B25J 15/0052 |
| 10,954,066 | B2 * | 3/2021 | Pankratov ........... | B65G 1/1373 |
| 2013/0017053 | A1 * | 1/2013 | Forget ................. | B65G 59/005 |
| | | | | 414/801 |

FOREIGN PATENT DOCUMENTS

EP 3623324 * 3/2020 ............. B65G 47/90

* cited by examiner

*Primary Examiner* — Lynn E Schwenning
(74) *Attorney, Agent, or Firm* — Perman & Green, LLP

(57) ABSTRACT

A tool, for depalletizing mixed pallet load article units, includes: a frame; a first grip assembly interfacing and engaging with a surface of a pallet load article unit, where the first grip assembly is movable, relative to the frame, in a first direction between gripping and ungripping positions; a second grip assembly, movably connected to the frame, and has at least a grip contact point oriented to interface with and generate a grip force, on another surface of the pallet load article unit, in a direction angled to the first direction, the second grip assembly being configured so as to effect, in combination with the first grip assembly, stable hold and pose of the pallet load article unit in a predetermined position; and an article unit seat member, is movably mounted to the frame, and disposed in opposition to at least one of the first and the second grip assembly.

29 Claims, 24 Drawing Sheets

HISTOGRAM OF LENGTH, WIDTH, HEIGHT
NORMAL

FIG. 1D

| VARIABLE | |
|---|---|
| —— | LENGTH |
| — — | WIDTH |
| ------ | HEIGHT |

| MEAN | StDEV | N |
|---|---|---|
| 14.00 | 3.151 | 3.888 |
| 9.703 | 2.359 | 3.888 |
| 7.529 | 3.164 | 3.888 |

FASTENER HOLES

150Y

2445

703

778

2445

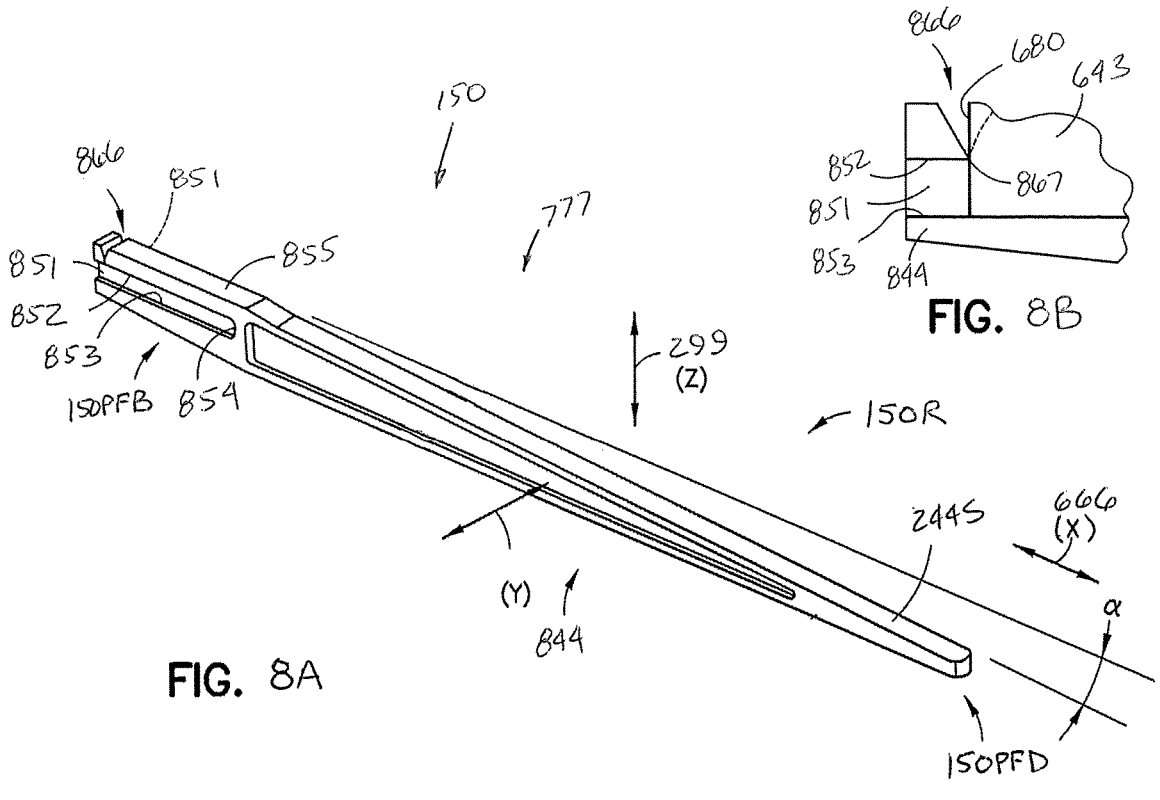
FIG. 8A
FIG. 8B
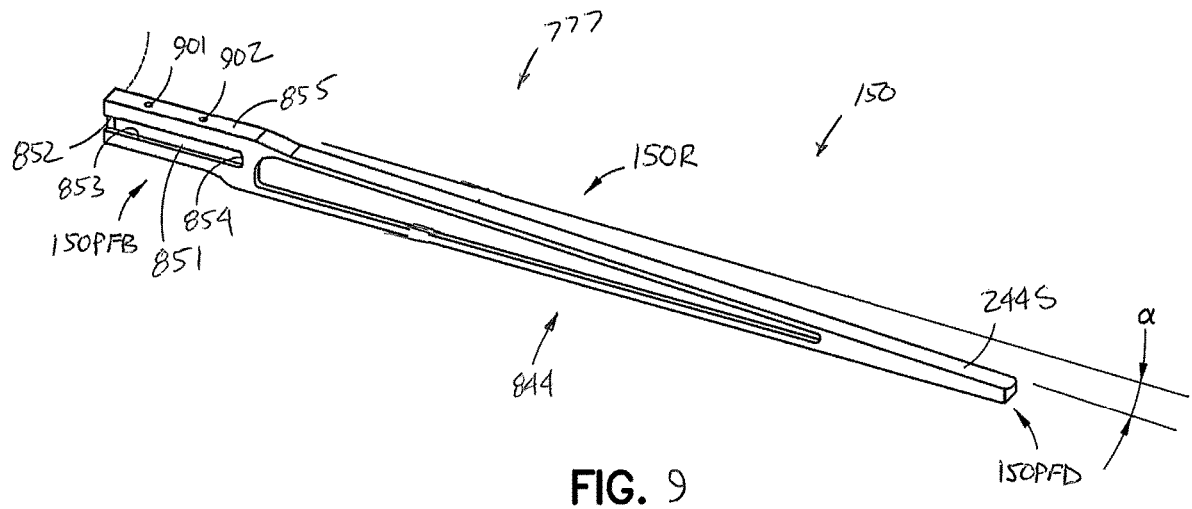
FIG. 9

543

150

2445

697

695

OBJECT

1000

PROVIDE DEPALLETIZING
TOOL                      —1200

INTERFACE AND ENGAGE A
GRIP ASSEMBLY WITH A
SURFACE OF A CASE UNIT    —1210

EFFECT STABLE HOLD AND
POSE OF THE CASE UNIT     —1220

PROVIDE DEPALLETIZING
TOOL                    — 1300

ENGAGE A SUBSTANTIALLY
PLANAR GRIP ARRAY WITH
A SURFACE OF A CASE UNIT   — 1310

EFFECT STABLE HOLD AND
POSE OF THE CASE UNIT     — 1320

TOOL, DEPALLETIZER INCLUDING THE TOOL, AND METHOD FOR DEPALLETIZING MIXED LOAD PRODUCTS

CROSS REFERENCE TO RELATED APPLICATIONS

This application is a non-provisional of and claims the benefit of U.S. Provisional Patent Application No. 63/588, 554, filed on Oct. 6, 2023, the disclosures of which are incorporated herein by reference in their entirety.

BACKGROUND

1. Field

The exemplary embodiments generally relate to depalletizing, and more particularly, to depalletizing of mixed load products.

2. Brief Description of Related Developments

Distribution centers and warehouses typically receive their products such as cases, boxes, open trays, stretch wrapped trays, etc. on a structured pallet, e.g. orderly positioned without gaps between them. Depalletizing systems are known in the art to remove the products from the pallet.

Sometimes the products need to be depalletized and singulated so they can be stored in an automatic storage and retrieval system. There are usually two approaches to do this. The first is manual depalletizing, where operators pick the products individually and forward them on an outfeed conveyor. The other approach is to use a robot arm equipped with a layer depalletizing tool to remove the products layer by layer and drop them on an outfeed conveyor. Technologies known as "bulk depalletizers" are used to remove a complete layer of products by pushing them from the pallet to an outfeed conveyor. In this situation, each layer of product is typically separated with a slip sheet. Products are singulated after being depalletized in order to be stored in an automatic storage and retrieval system.

Robotized layer depalletizing tools are quite efficient when large amounts of products are found on each layer (small to medium sized products). Because of the complexity of the depalletizing tool and the weight of the load, the cycle time is long and the efficiency (products per minute) drops when the products are large. In this later case, picking products one by one becomes a better approach. Also, with picking products one by one, the products do not have to be singulated downstream as products are picked one by one from the pallet. Picking products one by one reduces the footprint of the robotized depalletizing tool compared to the approach that includes the layer depalletizer coupled with a singulator.

A robotic system that allows depalletizing products as various as cases, boxes, trays and the like that are orderly positioned on a pallet with or without gaps between the products is desirable.

BRIEF DESCRIPTION OF THE DRAWINGS

The foregoing aspects and other features of the disclosed embodiment are explained in the following description, taken in connection with the accompanying drawings, wherein:

FIG. 1D is an exemplary graph illustrating various sizes of case unit that may be handled by the depalletizer of FIG. 1A in accordance with aspects of the disclosed embodiment;

FIGS. 8A and 8B are exemplary illustrations of a portion of the depalletizing tool of FIG. 1A in accordance with aspects of the disclosed embodiment;

FIG. 9 is an exemplary illustration of a portion of the depalletizing tool of FIG. 1A in accordance with aspects of the disclosed embodiment;

DETAILED DESCRIPTION

Figure 1A:
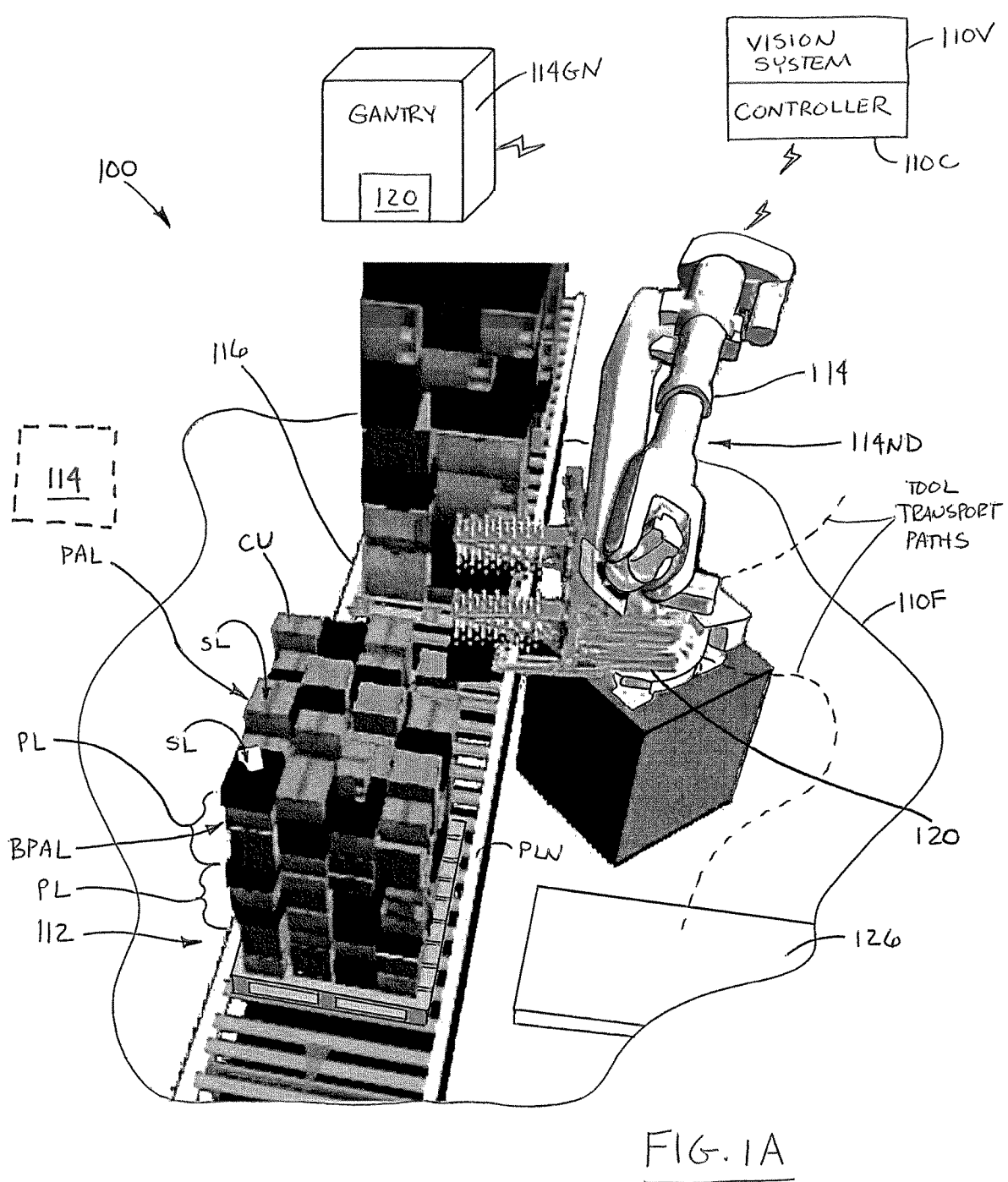
FIG. 1A is a schematic illustration of a depalletizer or depalletizer cell having a depalletizing tool incorporating aspects of the disclosed embodiment.
Figure 1B:
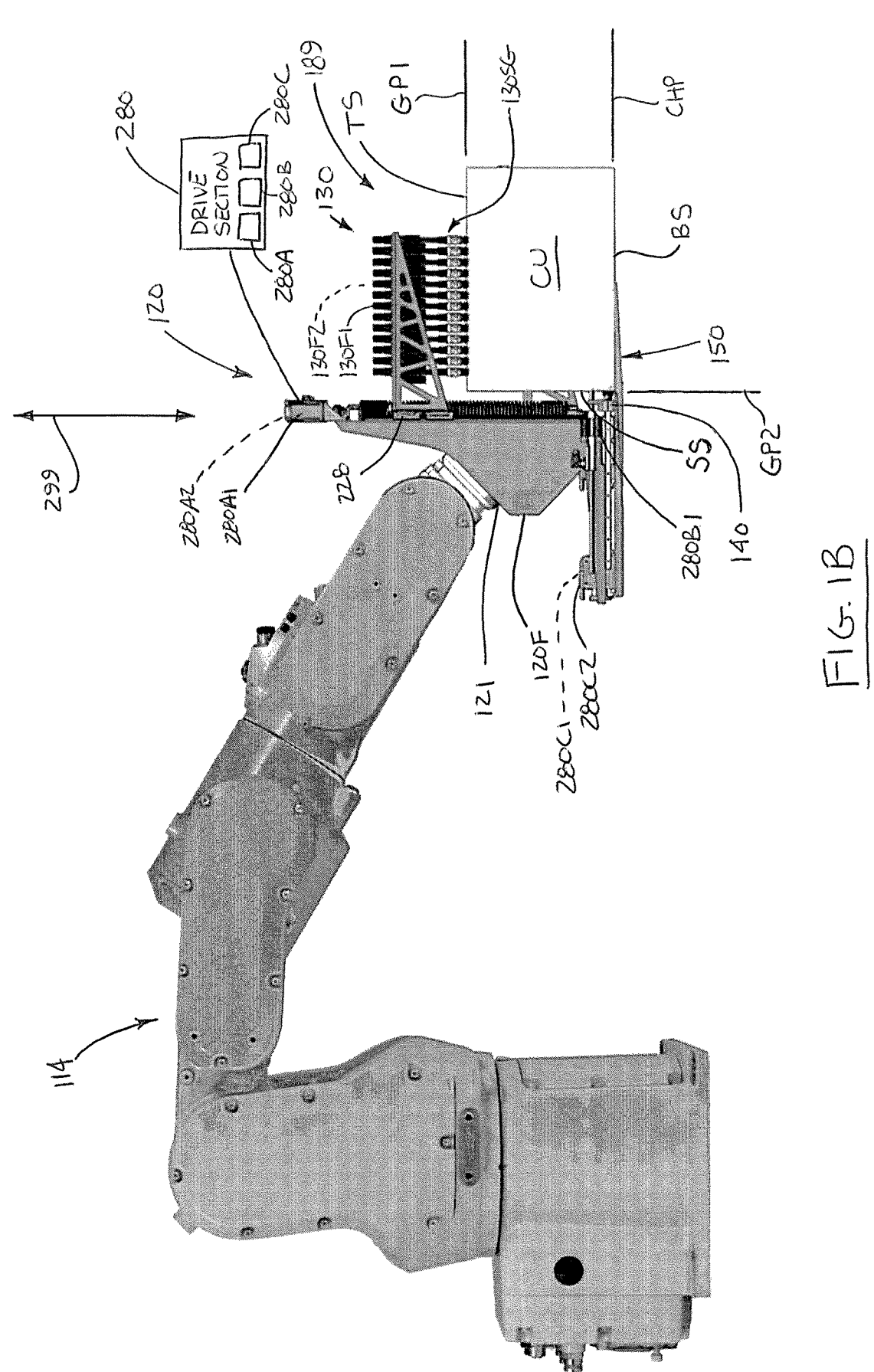
FIG. 1B is a portion of the depalletizer of FIG. 1A illustrating the depalletizing tool in accordance with aspects of the disclosed embodiment.
Figure 1C:
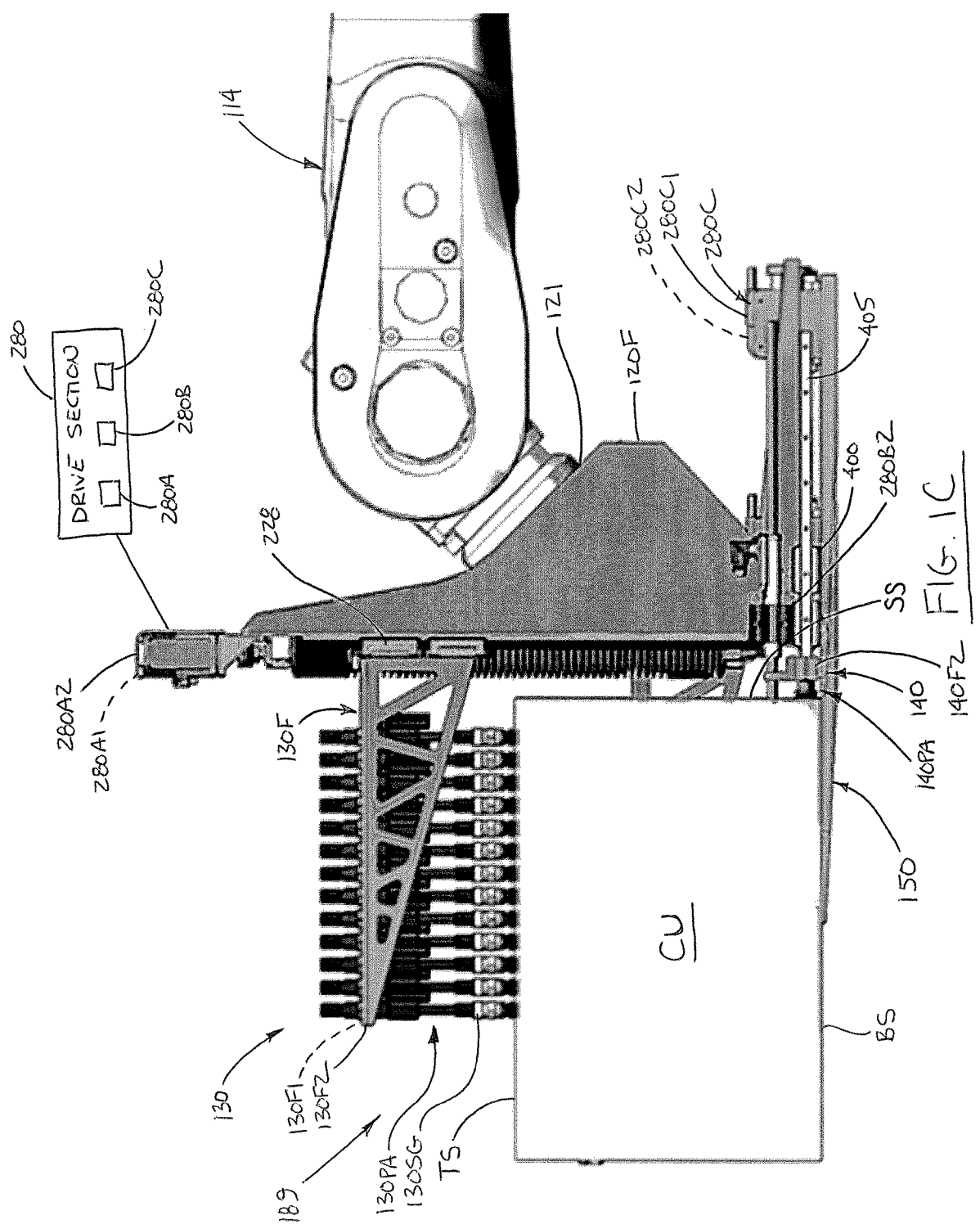
FIG. 1C is a portion of the depalletizer of FIG. 1A illustrating the depalletizing tool in accordance with aspects of the disclosed embodiment.

FIGS. 1A-1C illustrate an exemplary depalletizer cell or depalletizer 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The depalletizer 110 may be a vision-assisted robotized depalletizer that includes a frame 110F, a controller 110C, a pallet unloading or decommissioning station 112 for receiving a pallet load PAL (also referred to herein as a "pallet") of pallet load article units or case units CU from an infeed conveyor 116, a vision system 110V for taking one or more images of the pallet PAL, and at least one (which is inclusive of more than one) robotic case manipulators 114 (also referred to herein as "robots") each equipped with a depalletizing tool 120 for picking the case units CU one by one from the pallet load PAL and for positioning the case units CU on, for example, any suitable surface, such as of a case placement conveyor 126 that transports the depalletized case units CU from the depalletizer 110. While one robot 114 is illustrated for exemplary purposes only, in other aspects there may be more than one robot. The robot(s) 114 may be positioned relative to the pallet unloading station 112 in any suitable manner such that each case unit CU in the pallet load PAL is reachable by at least one of the robot(s) 114.

As an input, case units that can be of various sizes, arrive at the pallet unloading station 112 in a pallet load PAL from the infeed conveyor 116. Each one of the case units CU is gripped by the depalletizing tool 120 in such a way as to firmly hold the case unit CU to enable fast transfer to the case placement conveyor 126 without damaging the case unit CU and without relative movement between the case unit CU and the depalletizing tool 120. The case unit CU is released by the depalletizing tool 120 and placed on the case placement conveyor 126. As the case units are of various sizes, the depalletizing tool 120, as described herein, has a selectably variable configuration between different selectable grip configurations (see FIGS. 2A-2D). The different selectable grip configurations are selected based on a size of the case unit CU being picked.

The case units CU described herein may be cases or units of goods not stored in trays, on totes or on pallets (e.g., uncontained). In other examples, the case units CU may be cases or units of goods that are contained in any suitable manner such as in trays, on totes or on pallets. It is noted that the case units CU may include cased units of goods (e.g., case of soup cans, boxes of cereal, etc.) or individual goods that are adapted to be taken off of or placed on a pallet. In accordance with the disclosed embodiment, shipping cases for case units CU (e.g., cartons, barrels, boxes, crates, jugs, or any other suitable device for holding case units) may have variable sizes and may be used to hold case units CU in shipping and may be configured so they are capable of being palletized for shipping. It is noted that when, for example, bundles or pallet loads PAL of case units CU arrive (e.g., incoming pallets) at the depalletizer 110 the content of each pallet PAL may be uniform (e.g., homogeneous where each pallet PAL holds a predetermined number of the same item-one pallet holds soup and another pallet holds cereal) or non-uniform (e.g., mixed or heterogeneous, also referred to as rainbow pallets) where the pallets may contain any suitable number and combination of different/disparate case units CU (e.g., each pallet may hold different types of case units-a pallet holds a combination of soup and cereal). FIG. 1D is a graph illustrating the variation of case dimensions (e.g., length, width, and height) within a representative population of case units CU, such as may be found in a storage and retrieval system used to generate the mixed pallets loads PAL (such as shown in FIG. 1A). As may be realized, the mixed pallet loads may include many case units CU with dimensions from disparate portions of the dimension spectrum illustrated in FIG. 1D, where cases of disparate sizes are juxtaposed each other in a mixed pallet load build BPAL. Typically, there are no substantial gaps between the case units CU when placed on the incoming pallet PAL. It is to be noted, however, that a pallet load PAI, that includes gaps between the case units CU can also be provided as an incoming pallet that is input to a depalletizer 110 and processed thereby. While the aspects of the disclosed embodiment describe the depalletizer 110 as decommissioning a pallet load, the depalletizer in some aspects, may be employed to build or commission a pallet load. It is also noted that while the depalletizer 110 is described in the context of a storage and retrieval system, the depalletizer 10 may be applied to any environment in which case units are stored and retrieved.

It is to be noted that the case units illustrated in the figures are referred to using the same reference identifier "CU," even though the case units CU may vary in configuration and size.

The infeed conveyor 116 and case placement conveyor 126 may be in the form of any suitable conveyor. Suitable conveyors include, but are not limited to, roller type conveyors, drag chain conveyors, and belt conveyors.

Each of the robots 114 is equipped with the depalletizing tool 120 and is coupled to the vision system 110V for receiving information from the vision system 110V so as to effect, with the controller 110C, picking case units CU from the pallet load PAL and position the case units CU on the surface of the case placement conveyor 126 as described herein. Each robot 14 is configured to pick case units CU from stacks SL and/or layers PL of the pallet load PAL so as to decommission the pallet load PAL with vision system assistance. The robot 14 may be any suitable multiple axis industrial articulated robot arm 14ND (e.g., a four axis robot arm, a five axis robot arm, a six axis robot arm, or a robot arm with any suitable number of axes-see FIG. 1) that is equipped with the depalletizer tool 120 configured to transport case units CU to and from a pallet load. In other aspects, the robot 114 may be a gantry type transport 114GN (see FIG. 1) having the depalletizing tool 120 described herein. Suitable examples of robotic case manipulators include, but are not limited to, ABB® IRB 660, ABBR IRB 6640, ABB® IRB 6700, FANUC® R2000 or M410, or any similar robot arm offered by other manufacturers such as Kuka™ or Motoman™.

Still referring to FIGS. 1A-1C and also to FIGS. 2 and 3, the tool 120 for depalletizing the pallet load PAL of mixed case units CU (or in other aspects a pallet load of homogenous case units CU) will be described. The tool 120 includes a frame 120F, a grip assembly 130 (also referred to herein as a substantially planar grip array), another grip assembly 140 (also referred to herein as a substantially linear grip array), and an article unit seat member 150.

As described herein, the tool 120 includes a drive section 280 (see FIG. 1B) with at least three motors 280A, 280B, 280C defining at least three degrees of freedom operably coupled to each of the grip assembly 130, the other grip assembly 140, and the article unit seat member 150. It is noted that where the tool 120 includes more than one grip module 189M1, 189M2 there may be more than three motors. For example, where there are two grip modules 189M1, 189M2 there may be at least six motors defining at least three degrees of freedom for each grip module (see, e.g., FIGS. 2, 2A-2D, and 3). Here, there may be at least three motors for each of one or more grip modules of the tool 120. For each of the one or more grip modules at least one corresponding motor 280A, 280B, 280C with at least one corresponding degree of freedom is connected respectively to each of the grip assembly 130, the other grip assembly 140, and the article unit seat member 150 so that each of the grip assembly 130, the other grip assembly 140, and the article unit seat member 150 are independently actuable from each other.

The frame 120F is configured for mounting the tool 120 to the robot 114. For example, the frame 120F includes a robot-mounting bracket 121 that provides for coupling of the tool 120 to the robot 114 in a known and conventional manner. The frame 120F may have any suitable configuration for allowing the tool 120 to be coupled to a variety of robots 114 in a variety of orientations. For example, FIGS. 1A-1C illustrate the frame 120F being configured so that the robot-mounting bracket 121 is arranged at an angle relative to a case unit holding plane CHP of the tool 120. FIG. 2 illustrates the frame 120F of the tool 120 as being configured such that the robot-mounting bracket 121 is arranged substantially parallel with the case unit holding plane CHP of the tool 120. FIG. 3 also illustrates the frame 120F of the tool 120 as being configured such that the robot-mounting bracket 121 is arranged substantially parallel with the case unit holding plane CHP of the tool 120 however, in FIG. 3 a plane defined by the robot-mounting bracket 121 is unobstructed by the frame 120F, which may allow for 360 degree rotation of the tool 120 about a rotation axis BAX of the robot-mounting bracket 121 (such rotation being effected by a motor of the robot 114 that defines a degree of freedom of the robot 114). Here, the configuration of the frame 120F and the robot-mounting bracket 121 thereof illustrated in FIGS. 1A-3 may be suitable for coupling with any suitable multiple axis industrial articulated robot arm 14ND. The configuration of the frame 120F and the robot-mounting bracket 121 thereof illustrated in FIG. 3 may be suitable for coupling with any suitable gantry type transport 114GN.

Figure 2:
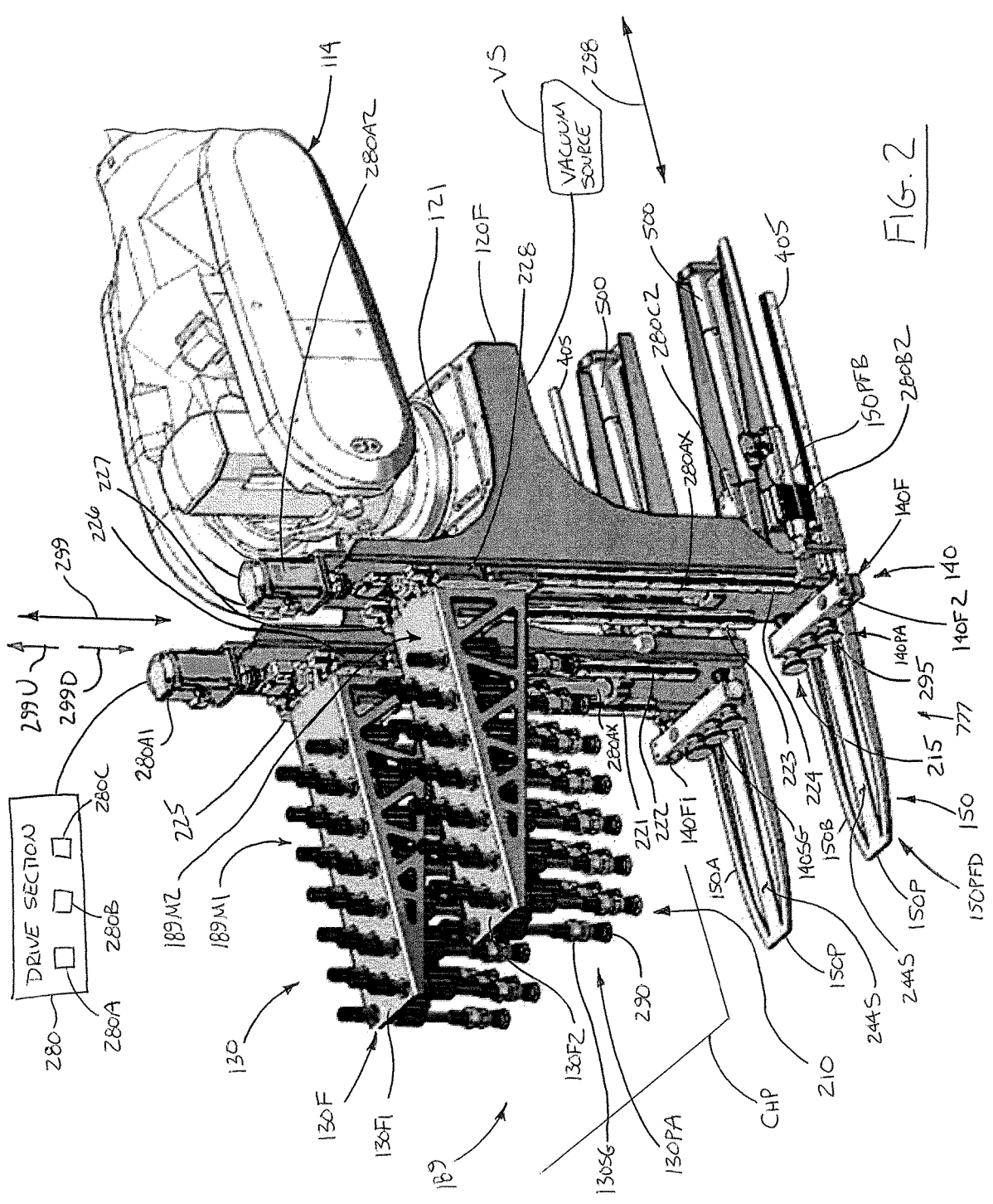
FIG. 2 is a portion of the depalletizer of FIG. 1A illustrating the depalletizing tool in accordance with aspects of the disclosed embodiment.
Figures 2A, 2B:
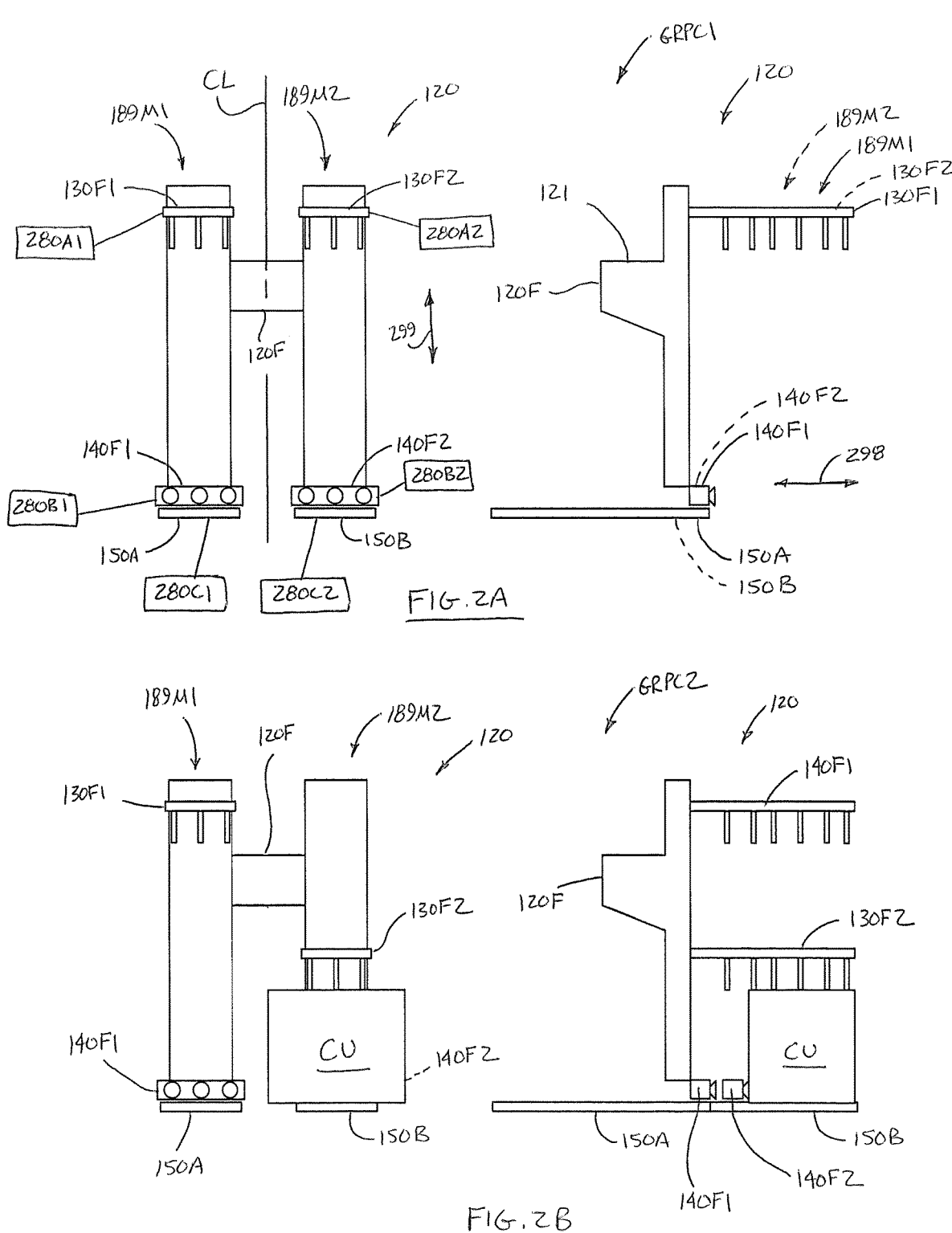
FIGS. 2A-2D are exemplary grp configurations of the depalletizing tool of FIG. 1A in accordance with aspects of the disclosed embodiment.
Figures 2C, 2D:
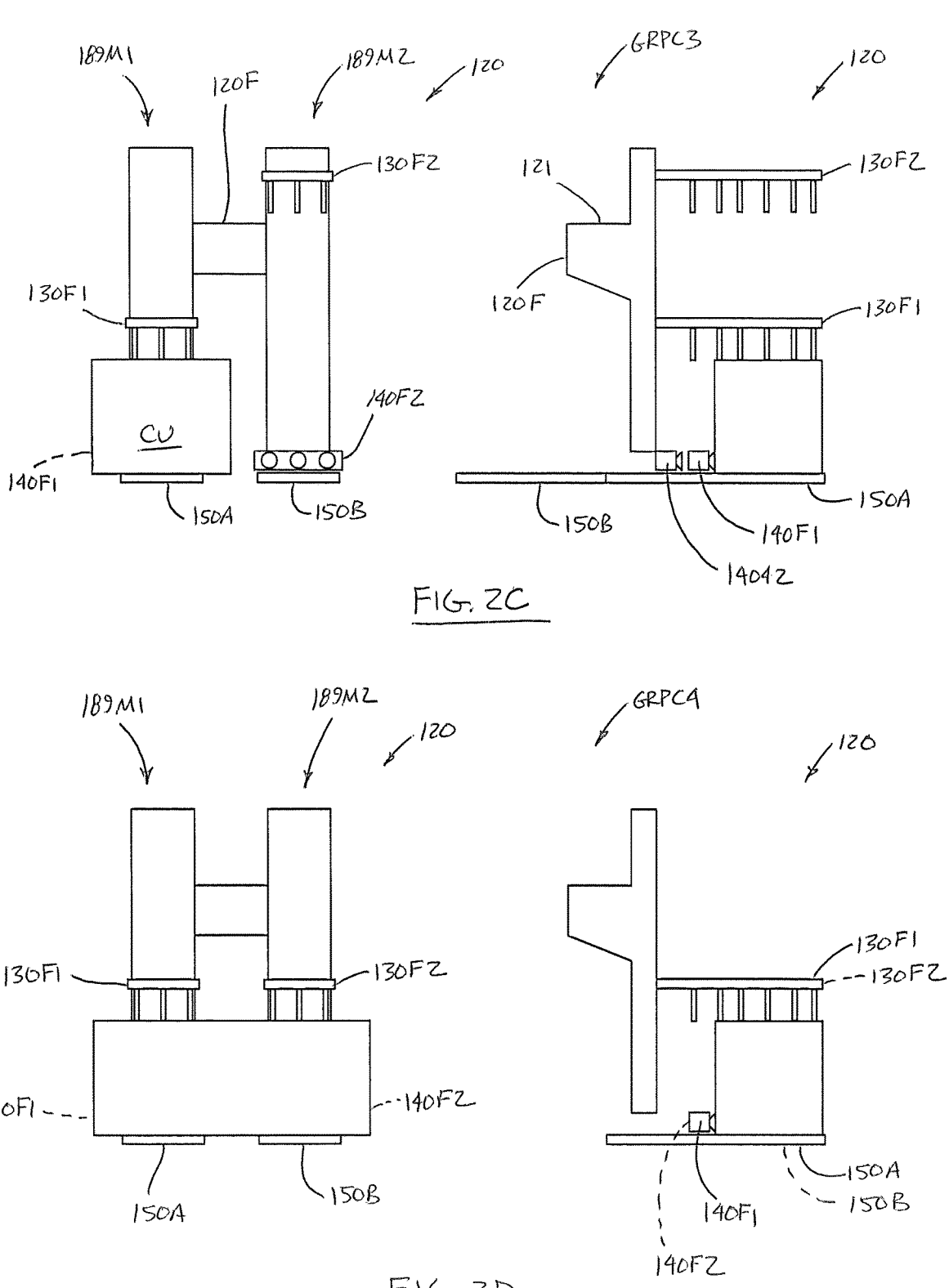
Figure 3:
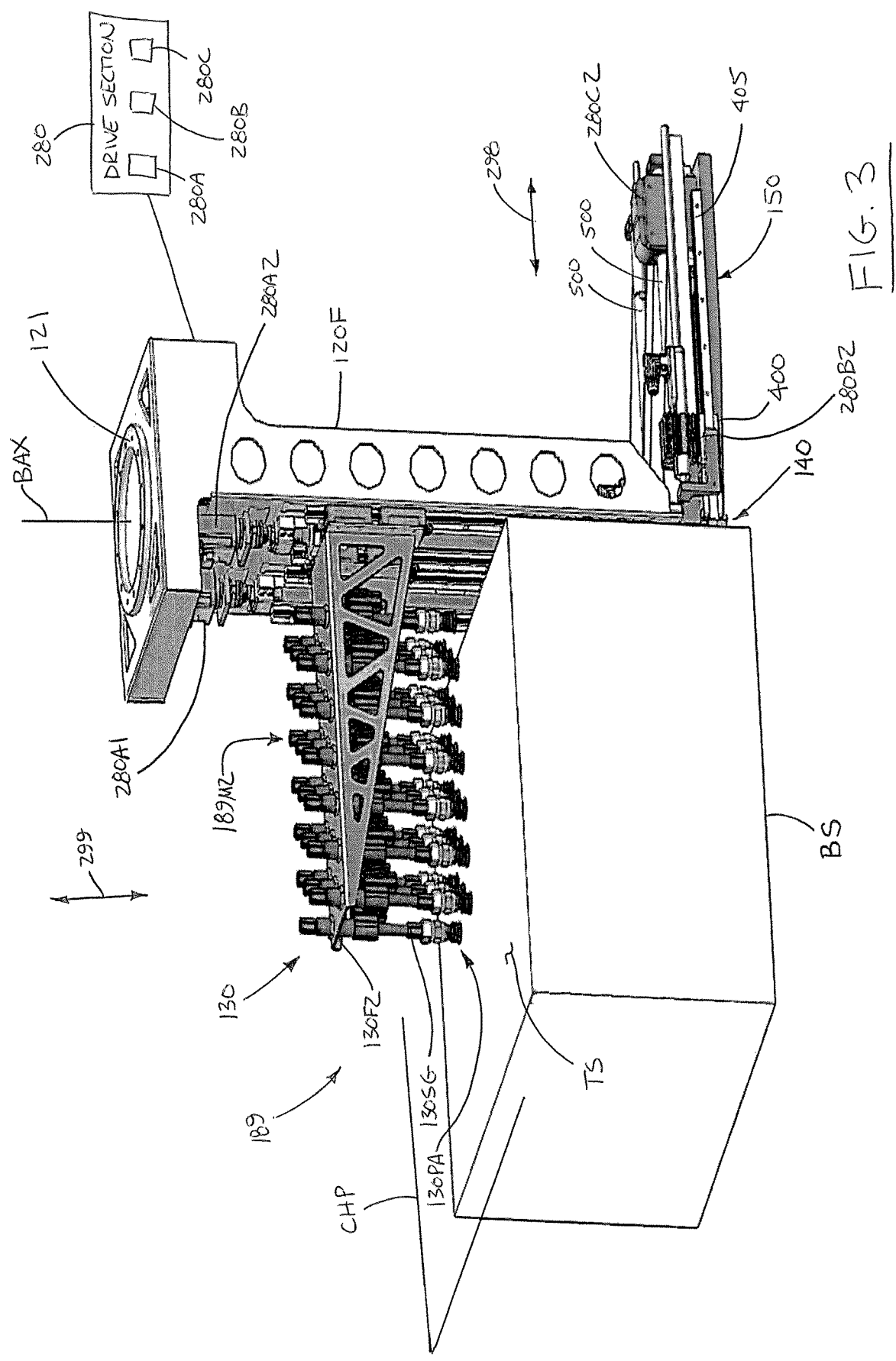
FIG. 3 is an exemplary illustration of the depalletizing tool of FIG. 1A in accordance with aspects of the disclosed embodiment.

With specific reference to FIGS. 1B and 2, the grip assembly 130 is movably connected to the frame 120F and has a grip face 210 with a predetermined orientation defining a substantially plane (or planar) grip interface GP1 shape in direction 299. The substantially plane (or planar) grip interface GP1 (FIG. 1B) shape may be substantially parallel with the case unit holding plane CHP. The grip face 210 interfaces and engages with a surface TS of a case unit CU. The surface TS of the case unit CU substantially faces the direction 299. The grip assembly 130 is movable, relative to the frame 120F, in the first direction 299 between a gripping position (see FIG. 1B) and an ungripping position (see FIG. 2).

As will be described herein, the grip assembly 130 has at least one grip contact point 290 that is oriented to interface with and generate a grip force on the surface TS of the case unit CU.

The grip assembly 130 has a pneumatic array 130PA configured to grip the surface TS of the case unit CU, where the pneumatic array is operated by air in any suitable manner so as to grip the surface TS of the case unit CU, such as operated by the exhaustion of air (e.g., vacuum). Here, the pneumatic array 130PA includes more than one vacuum gripper 130SG such as a suction cup or other compliant cup that conforms to the surface TS so that a vacuum force may be generated between the compliant cup and the surface TS for gripping the case unit CU. The more than one vacuum gripper 130SG is coupled to any suitable vacuum source VS of the depalletizing tool 120 or the robot 114 such that a loss of vacuum (or non-contact with the case unit) of one vacuum gripper 130SG does not affect the vacuum grip of the case unit CU effected by other vacuum grippers 130SG in the pneumatic array 130PA. In some aspects, each vacuum gripper 130SG includes a respective vacuum source while in other aspects the vacuum grippers 130SG are coupled to a common vacuum source. In some aspects, the vacuum grippers 130SG are compliant where the suction cup moves in direction 299 under impetus of contact between the suction cup and the case unit CU and movement of the depalletizing tool 120 and/or grip assembly 130 towards the case unit CU. The compliance of the vacuum grippers may open and close valves within the vacuum grippers 130SG that when open (e.g., contact between the vacuum gripper 130SG and the case unit exists and the depalletizing tool 120 or grip assembly 130 moves towards the case unit to open the valve via compliance of the vacuum gripper 130SG) provide suction from the vacuum source VS to the suction cup of a respective vacuum gripper 130SG and when closed prevents a decrease in vacuum pressure as no suction is provided to the respective vacuum gripper 130SG. Each of the vacuum grippers 130SG forms a grip contact point 290 that is oriented to interface with and generate a grip force on the surface TS of the case unit CU where, the actuated vacuum grippers 130SG collectively form the grip face 210 that interfaces and engages with the surface TS of the case unit CU.

The frame 120F includes one or more guides 221-224 along which the grip assembly 130 moves in the direction 299. The one or more guides 221-224 may be any suitable guides such as linear rails. The grip assembly 130 includes a grip assembly frame 130F having any suitable carriage(s) 225-228 coupled thereto, where the carriage(s) 225-228 travel along a respective guide 221-224. To move the grip assembly frame 130F along the one or more guides 221-224 (and hence move the grip assembly 130 in direction 299), the drive section 280 includes at least one motor 280A that drives the grip assembly 130 in direction 299 along the one or more guides 221-224. The at least one motor 280A may be any suitable rotary motor (such as a servo motor, stepper motor, etc.) that drives the grip assembly frame 130F through actuation of any suitable transmission 280AX (e.g., a ball screw, chain and sprocket, belt and pulley, etc.) coupled to the grip assembly frame 130F. In other aspects, the at least one motor 280A may be any suitable linear motor/drive.

Figure 14:
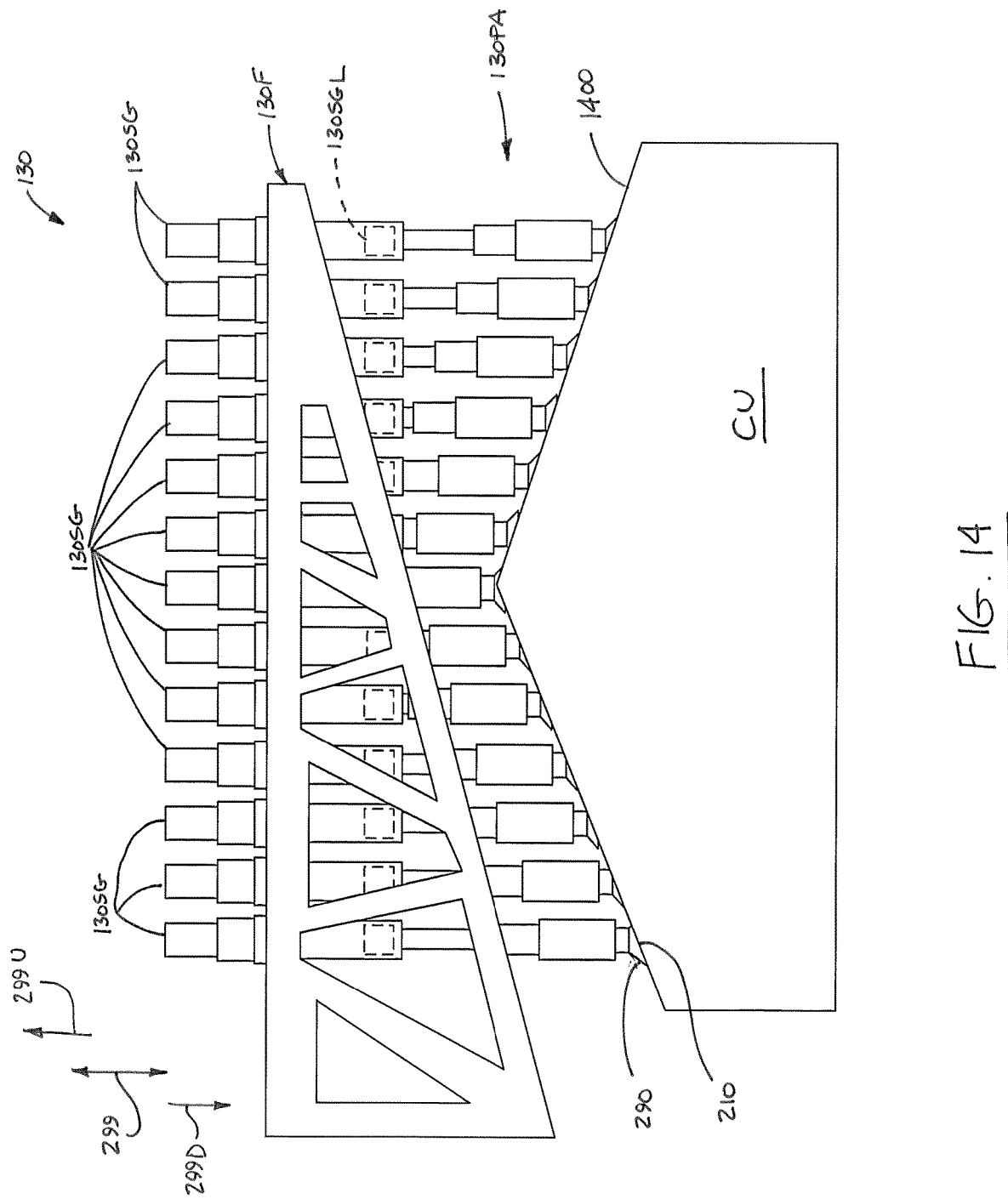
FIG. 14 is a schematic illustration of a portion of the depalletizer of FIG. 1A in accordance with aspects of the disclosed embodiment.
Figure 15:
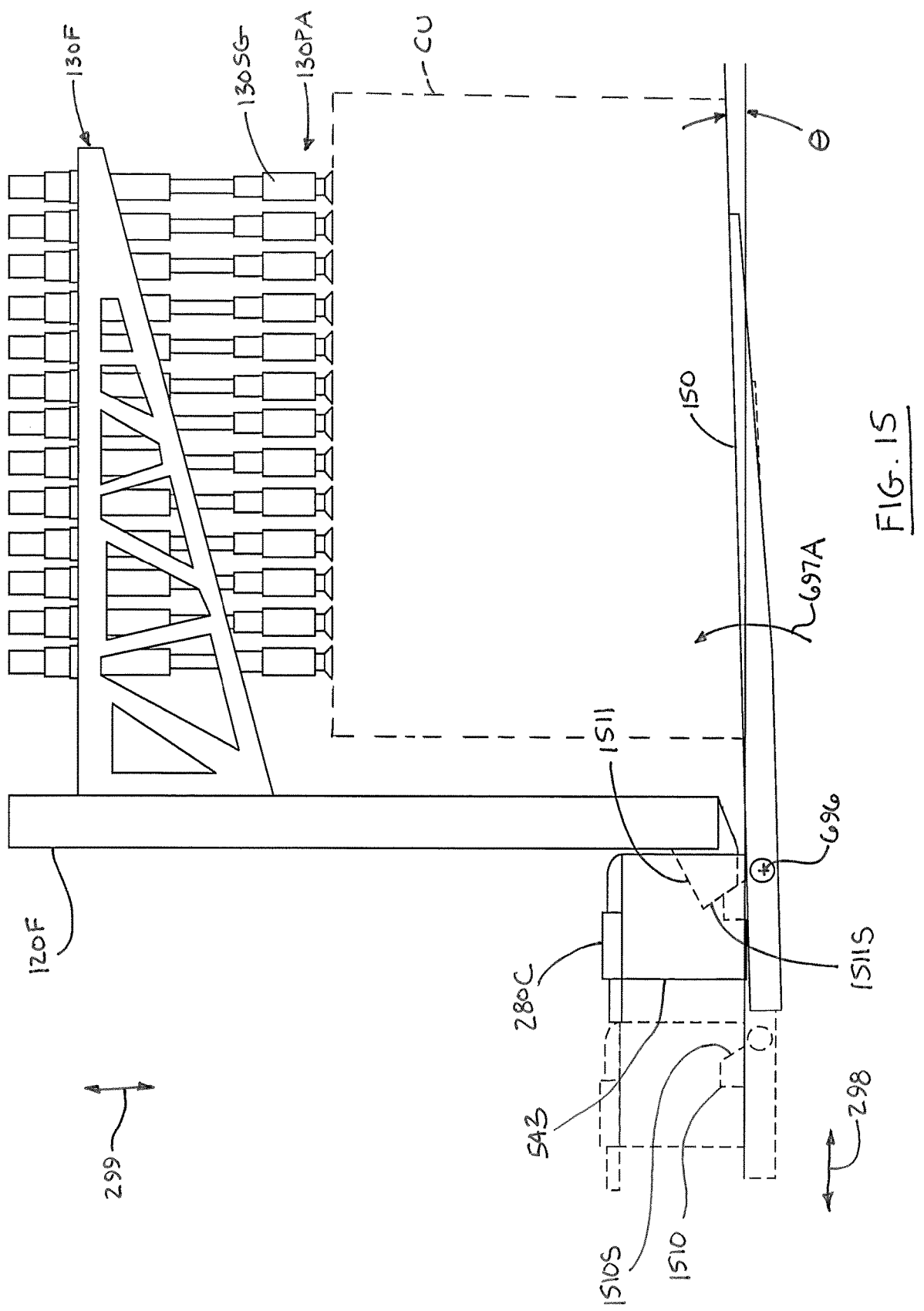
FIG. 15 is a schematic illustration of a portion of the depalletizer of FIG. 1A in accordance with aspects of the disclosed embodiment.
Figure 16:
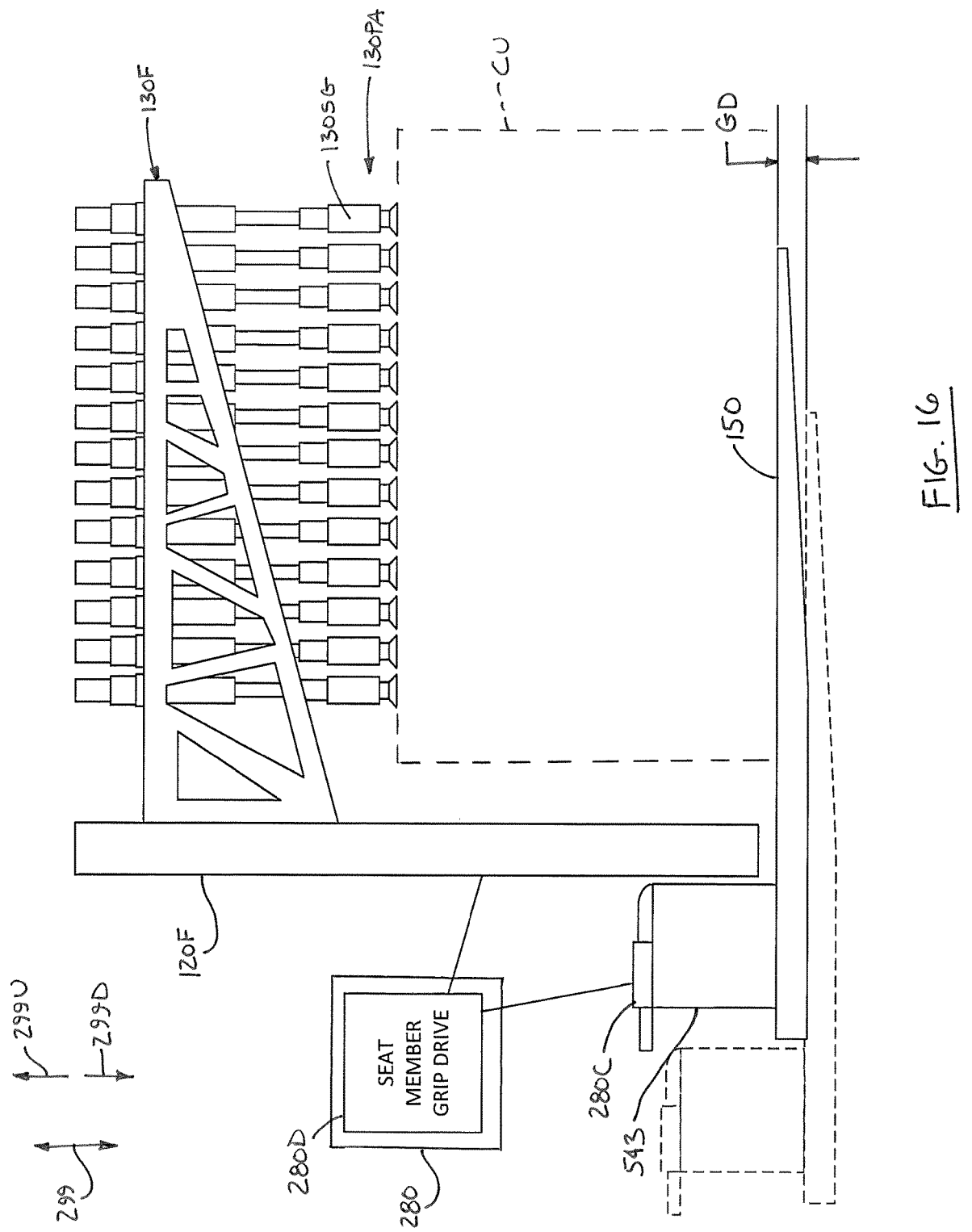
FIG. 16 is a schematic illustration of a portion of the depalletizer of FIG. 1A in accordance with aspects of the disclosed embodiment.

Referring also to FIG. 14, in one or more aspects, the grip contact points 290 of each of the vacuum grippers 130SG is configured to move or "float" in direction 299, independent of other grip contact points 290 of other vacuum grippers 130SG, relative to the respective grip assembly frame 130F so that the grip face 210 collectively formed by the vacuum grippers of the respective grip assembly frame 130F contour to a contoured surface 1400 (the contoured surface 1400 being inclusive of, but not limited to, a substantially planar surface, an arcuate (concave and/or convex) surface, a facetted or uneven surface, or any combination thereof) of the case unit CU being gripped. In one or more aspects, the grip contact points 290 may each be biased in direction 299D towards the article unit seat member 150 in any suitable manner (e.g., by air pressure, springs, etc.) where movement of the grip assembly 130 in direction 199D and contact of the grip contact points 290 with the case unit CU moves the grip contact points in direction 299U against the biasing force. In some aspects, each of the vacuum grippers 130SG includes any suitable locking device 130SGL configured to lock a respective grip contact point 290 from movement in direction 299 with the grip contact point gripping the contoured surface 1400 of the case unit CU. The locking device 130SGL may be a pneumatic locking device, a mechanical locking device, or any other suitable locking device that prevents or otherwise locks movement of the grip contact point 290 in direction 299.

The other grip assembly 140 is movably connected to the frame 120F. The other grip assembly 140 has at least a grip contact point 295 oriented to interface with and generate a grip force, on surface SS of the case unit CU, in a direction 298 angled to the direction 299. The other grip assembly 140 is movable substantially in the angled direction 298 and is configured so as to effect, in combination with the grip assembly 130, stable hold and pose of the case unit CU in a predetermined position (see, e.g., FIGS. 1A-1C), with respect to the frame 120F, substantially upon contact with the case unit CU.

The other grip assembly 140 has a grip face 215 with a predetermined orientation defining a substantially plane (or planar) grip interface GP2 in direction 298 interfacing and engaging with a surface SS of the case unit CU. The surface SS of the case unit CU substantially faces the direction 298.

The other grip assembly 140 has a pneumatic array 140PA configured to grip the surface SS of the case unit CU. The pneumatic array 140PA includes more than one vacuum gripper 140SG such as a suction cup or other compliant cup that conforms to the surface SS so that a vacuum force may be generated between the compliant cup and the surface SS for gripping the case unit CU. The more than one vacuum gripper 140SG is coupled to any suitable vacuum source VS of the depalletizing tool 120 or the robot 114 such that a loss of vacuum (or non-contact with the case unit) of one vacuum gripper 140SG does not affect the vacuum grip of the case unit CU effected by other vacuum grippers 140SG in the pneumatic array 140PA. In some aspects, each vacuum gripper 140SG includes a respective vacuum source while in other aspects the vacuum grippers 140SG are coupled to a common vacuum source. In some aspects, the vacuum grippers 140SG are compliant where the suction cup moves in direction 298 under impetus of contact between the suction cup and the case unit CU and movement of the depalletizing tool 120 and/or other grip assembly 140 towards the case unit CU. The compliance of the vacuum grippers may open and close valves within the vacuum grippers 140SG that when open (e.g., contact between the vacuum gripper 140SG and the case unit exists and the depalletizing tool 120 and/or other grip assembly 140 moves towards the case unit to open the valve via compliance of the vacuum gripper 140SG) provide suction from the vacuum source VS to the suction cup of a respective vacuum gripper 140SG and when closed prevents a decrease in vacuum pressure as no suction is provided to the respective vacuum gripper 140SG. Each of the vacuum grippers 140SG forms a grip contact point 295 that is oriented to interface with and generate a grip force on the surface SS of the case unit CU where, the actuated vacuum grippers 140SG collectively form the grip face 215 that interfaces and engages with the surface SS of the case unit CU.

Figure 4:
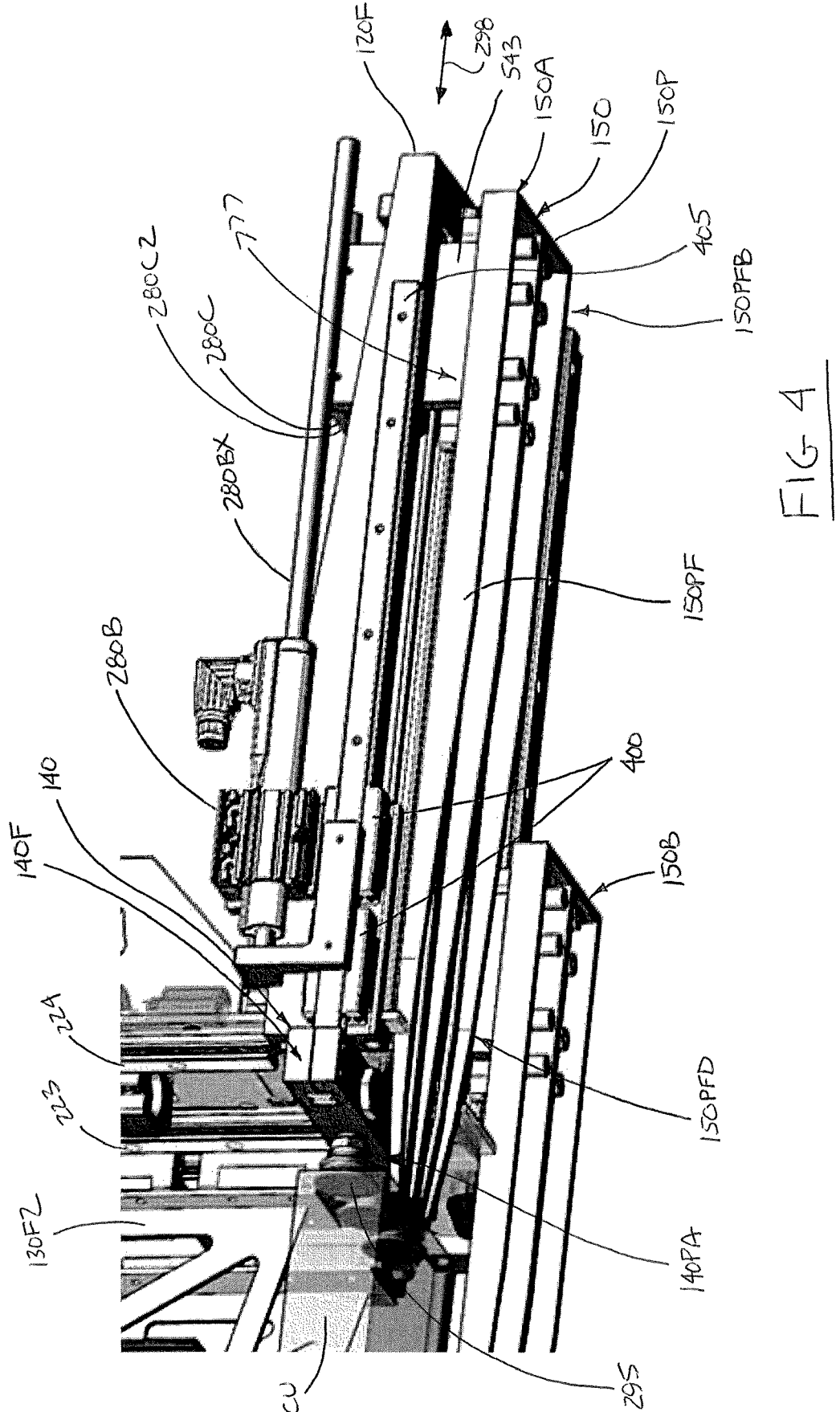
FIG. 4 is an exemplary illustration of a portion of the depalletizing tool of FIG. 1A in accordance with aspects of the disclosed embodiment.

Referring also to FIG. 4, the frame 120F includes one or more guides 400 along which the grip assembly 140 moves in the direction 298. The one or more guides 400 may be any suitable guides such as bushings or stationary carriages. The grip assembly 140 includes a grip assembly frame 140F having any suitable rail(s) 405 (one rail is illustrated for exemplary purposes but in other aspects there may be more than one rail) coupled thereto. Here, the rail(s) 405 slide within or through the respective guide 400. To move the grip assembly frame 140F along within or through the guide(s) 405 (and hence move the grip assembly 140 in direction 298), the drive section 280 includes at least one motor 280B that drives the grip assembly 140 in direction 298 along within or through the guide(s) 405. The at least one motor 280B may be any suitable linear motor (such as a servo motor, stepper motor, piezo-electric motor, pneumatic drive, hydraulic drive, ball screw drive, etc.) that drives the grip assembly frame 140F through actuation of any suitable transmission 280BX (e.g., a rod, shaft, etc. driven by the motor 280B) coupled to the grip assembly frame 140F.

Still referring to FIGS. 1A-1C, 2 and 3, the article unit seat member 150 is movably mounted to the frame 120F as described herein. The article unit seat member 150 is disposed in opposition to (e.g., opposed to) at least one of the grip assembly 130 and the other grip assembly 140. As described herein, the hold of the case unit CU by the grip assembly 130 and the other grip assembly 140 secures the case unit CU in the predetermined position (see FIGS. 1A-1C) against sliding seating contact of the article unit seat member 150 against the case unit CU.

The article unit seat member 150 is movable, relative to the frame 120F, between seated and unseated positions, wherein in the seated position the article unit seat member 150 is seated against still another surface BS of the case unit CU. Here, the gripped case unit CU is engaged at least on three sides TS, SS, BS gripped by, and between, the grip assembly 130, the other grip assembly 140, and the article unit seat member 150.

With the case unit gripped by one or more of the grip assembly 130 and the other grip assembly 140 for picking the case unit CU from the pallet load PAL, the article unit seat member 150 is extended in direction 298, from a retracted (or unseated) position (i.e., not underneath the case unit CU so that the tool 120 may grip the case unit CU without obstruction by (e.g., free and clear of) the article unit seat member 150) to an extended (or seated) position underneath the case unit CU, where the article unit seat member 150 may contact and slide against the case unit CU with the motion of the article unit seat member 150 from the retracted position to the extended position underneath. Gripping the case unit with the grip assembly 130 and the other grip assembly 140 substantially maintains the case unit CU in the predetermined position with the extension motion of the article unit seat member 150. Similarly, with the case unit gripped by one or more of the grip assembly 130 and the other grip assembly 140 for placing the case unit CU at the case placement conveyor 126, the article unit seat member 150 is retracted in direction 298, from the extended position to the retracted position, where the article unit seat member 150 may contact and slide against the case unit CU with the motion of the article unit seat member 150 from the extended position to the retracted position. Gripping the case unit with the grip assembly 130 and the other grip assembly 140 substantially maintains the case unit CU in the predetermined position with the retraction motion of the article unit seat member 150.

Figure 5:
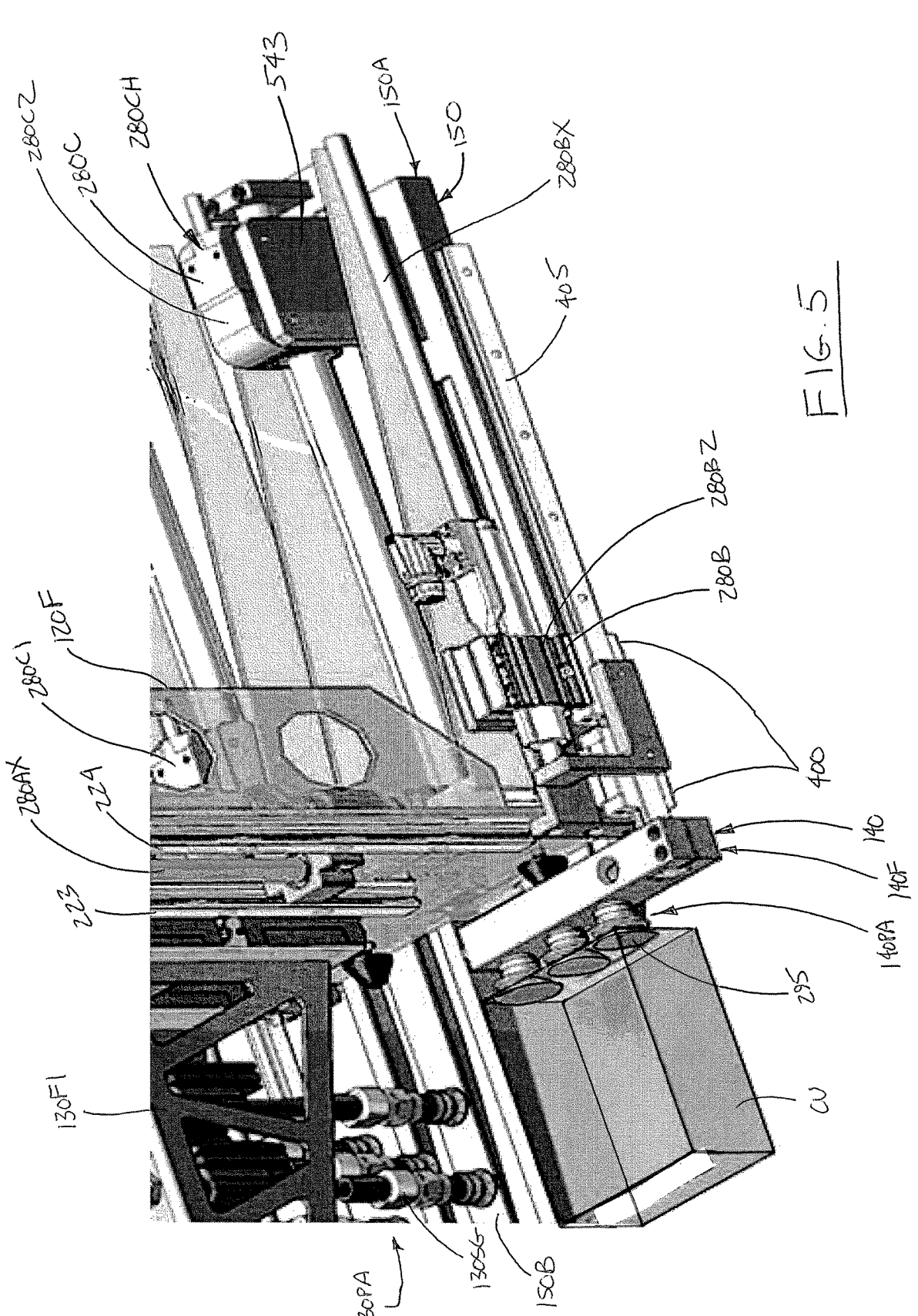
FIG. 5 is an exemplary illustration of a portion of the depalletizing tool of FIG. 1A in accordance with aspects of the disclosed embodiment.
Figure 5A:
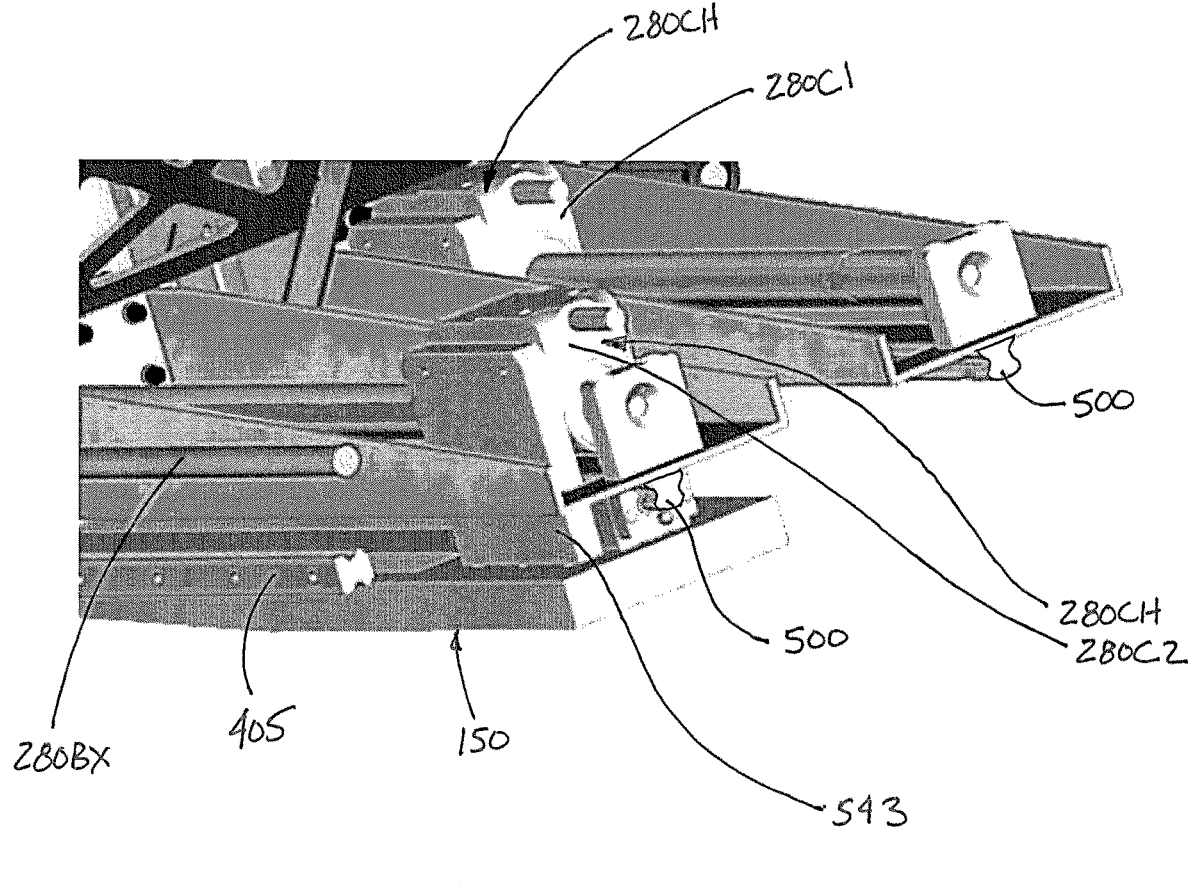
FIG. 5A is an exemplary illustration of a portion of the depalletizing tool of FIG. 1A in accordance with aspects of the disclosed embodiment.

Referring also to FIGS. 4, 5, and 5A, the frame 120F includes at least one guide member 500 (see FIG. 5A-two guide members are illustrated for exemplary purposes but in other aspects there may be more or less than two guide members 500) that extends in direction 298. The guide member may be any suitable guide member such as a rail, rod, etc. The article unit seat member 150 is cantilevered from and movable along the guide member 500 in direction 298. To move the article unit seat member 150 along the guide(s) 500 in direction 298, the drive section 280 includes at least one motor 280C that drives the article unit seat member 500 in direction 298 along the guide(s) 500. The at least one motor 280C may be any suitable linear motor (such as a servo motor, stepper motor, piezo-electric motor, pneumatic drive, hydraulic drive, ball screw drive, etc.) that drives the article unit seat member 150 along the guide(s) 500 where the motor 280C travels along the guide(s) 500 with the article unit seat member 150. In other aspects, the article unit seat member 150 may be linearly driven in any suitable manner, such as in a manner substantially similar that of the grip assembly 130 or the other grip assembly 140.

Each motor 280C has a housing 280CH that forms a carriage that travels along a respective guide 500. The carriage 280CH includes post 543 to which a seat member mounting bracket 643 is coupled. The seat member mounting bracket 643 coupling 695 to the post 543 is positionally deterministic so that the coupling 695 deterministically positions the article unit seat member 150 in direction 299 in a predetermined reference orientation (the predetermined reference orientation is where the support surface 244S (and a support plane formed thereby) is substantially parallel with the plane formed by the grip interface GP1) with a support surface 244S of the article unit seat member 150 at a predetermined reference orientation relative to the frame 120F.

In one or more aspects, the coupling 695 is movably released in a released direction 697 (see FIGS. 4A, 4B, 6A, and 10A-10C) different than the direction 299 so that the article unit seat member 150 is substantially freely movable relative to the frame 150F in the released direction 697 away from the predetermined reference orientation. In other aspects, the coupling 692 may not be movably released in release direction 697. The movably released configuration of the article unit seat member 150 provides for the article unit seat member 150 to be movable substantially freely relative to the frame 120 in at least the released direction 697 with the grip (as described herein) of the tool 120 in a condition other than clamped, wherein a case unit CU is gripped by the support surface 244S and one or more of the grip assembly 130 and the other grip assembly 140. In one aspect, the coupling 695 has a pivot or otherwise compliant coupling 650 disposed between seat member mounting bracket 643 coupling 695 to the post 543 that defines the motion release of the coupling 695 so that the article unit support member 150 is movable relative to the frame 120F in the released direction 697. For example, the seat member mounting bracket 643 is coupled to the post 543 in any suitable manner so as to pivot about pivot axis 696 so that compliance of the article unit seat member 150 moves the support surface 244S relative to the frame 120F in the released direction 697 away from the predetermined reference orientation. The compliant coupling 650 is configured so that the article unit seat member 150 is compliant independent of whether the depalletizing tool 120 is in a gripping condition, wherein the case unit CU is gripped by the support surface 244S and one or more of the grip assembly 130 and other grip assembly 140, and an ungripping condition, wherein the case unit CU is not gripped or the depalletizing tool 120 does not have a case unit CU thereon.

The pivoting movement of the seat member mounting bracket 643 is arrested by one or more stop surfaces 600-603 (FIG. 6A) of one or more of the seat member mounting bracket 643 and post 543. In one aspect, the stop surfaces 600 of the seat member mounting bracket 643 contact stop surface 602 of the post 543 to arrest rotational movement of the article nit seat member 150 in direction 697 and set the predetermined reference orientation. In another aspect, the stop surface 601 of the post 543 contacts stop surface 603 of the seat member mounting bracket 643 to arrest rotational movement of the article unit seal member 150 in direction 697 and set the predetermined reference orientation. In other aspects, any suitable combination of stop surfaces 600-603 may be used to arrest rotation movement of the article unit seat member 150 in direction 697 to set the predetermined reference orientation; while in still other aspects the predetermined reference orientation may be set in any suitable manner. It is noted that the article unit seat member 150 and seat member mounting bracket 643 may be held in the predetermined reference orientation by virtue of the cantilevered weight of the article unit seat member 150. For example, the article unit seat member 150 is cantilevered from the seat member mounting bracket 643 so that a force 277 is generated by the weight of the article unit seat member 150 on one side of the pivot axis 696 so that the article unit seat member 150 and seat member mounting bracket 643 are held in the predetermined reference orientation.

The article unit seat member 150 is coupled to the seat member mounting bracket 643 as described herein. The article unit seat member 150 may have any suitable configuration for supporting a case unit CU thereon. For example, referring to FIGS. 2, 4, and 6A-9, the article unit seat member 150 may be in the form of one or more forks 150R, one or more paddles or flaps 150P, or any other suitable configuration (e.g., one or more rods, bars, or any combination thereof forming a support plane) for supporting a case unit CU thereon. The article unit seat member forms a support surface 244S disposed in a predetermined reference position and orientation (referred to herein as the predetermined reference orientation as described herein), so as to support thereon a case unit CU seated on the support surface 244S.

The seat member mounting bracket 643 includes at least one recess 643R, each recess 643R being configured to receive a respective protrusion 543P and having or otherwise forming the stop surface 603 of the seat member mounting bracket 643. The protrusion 543P and the respective recess 643R form a releasable detent or latch that at least in part maintains the article unit seat member 150 in the predetermined reference orientation. For example, at least one protrusion 543P includes one or more recesses 543R disposed on one or more sides of the protrusion 543P. The recess 643R includes biased detent members 676 (e.g., balls, pins, etc.) that are biased towards a respective recess 543R of the at least one protrusion 543P, where the recess 543R is shaped and sized so that at least a portion of a respective biased detent member 676 is received by and engages the recess 543R. The bias force exerted by the biased detent member 676 against the recess 543R along with the shapes of the engagement surfaces of the biased detent member 676 and the recess 543R is such that the article unit seat member 150 (and the seat member mounting bracket 643) are releasably maintained in the predetermined reference orientation (e.g., the releasable detent/latch formed by the recess 543R and biased detent member 676 is released upon a predetermined force being applied to the article unit seat member 150 so as to provide compliance of the article unit seat member 150 as described herein while substantially preventing undesired motion of the article unit seat member 150 during, e.g., loading and unloading movement of the depalletizing tool 120 by the robot arm 114).

Referring to FIGS. 1, 6A-6B, 8A-9, the article unit seat member 150 is configured as one or more forks 150R each having one or more support members 844. Each support member 844 and a support surface 244S thereof has a proximal end 150PFB and a distal end 150PFD disposed so that the case unit CU is seated (at least in part so as to be stably held) between the proximal end 150PFB and the distal end 150PFD, and the support member 844, is coupled to the post 543 (such as with the seat member mounting bracket 643) at the proximal end 150PFB, and wherein the support surface 244S is has an anhedral angle α, relative to a predetermined level plane PLN (such as of the conveyor 116 or a top/bottom surface of a case unit in the pallet load PAL-see FIG. 1), between the proximal end 150PFB and distal end 150PFD so that the case unit CU seated on the support surface 244S is disposed at the anhedral angle α at discharge (e.g., retraction of the article unit seat member 150 from the extended position to the retracted position) from the depalletizing tool 120 from the distal end 150PFD of the support surface 244S. In other aspects, the support surface 244S may have any suitable angle (or no angle) relative to the predetermined level plane PLN.

The support member 844 is coupled to the post 543 with a coupling 661 (FIG. 6A) of the seat member mounting bracket 643 that is compliant at least in part. As an example, the support member 844 is removably joined to the seat member mounting bracket 643 with a sliding joint 620 configured so that the support member 844 and seat member mounting bracket 643 slide relative to each other, and the support member 844 is joined and dis-joined to the seat member mounting bracket 643 by relative sliding between the support member 844 and the seat member mounting bracket 643. In one aspect, the support member 844 is removably joined to the seat member mounting bracket 643 by a slot joint 621 that effects a substantially tool-less fast swapping (although in other aspects tools may be employed where a fast swapping configuration is not provided) of one support member 844 with another support member 844 (such as for replacement), where the tool-less fast swapping may be referred to as sliding one support member 844 out from the seat member mounting bracket 643 in a substantially straight line (in direction 666-FIG. 6A) movement and replacing the removed support member with another different support member 44 by sliding the different support member 844 into the seat member mounting bracket 643 (i.e., so as to occupy the space of in the mounting bracket of the just removed support member) in a substantially straight line movement (in direction 666-FIG. 6A). The slot joint 621 defines a guideway interface between the seat member mounting bracket 643 and the support member 844 so that the seta member mounting bracket 643 and the support member 844 slide relative to each other in sliding direction 666 effecting coupling and decoupling of the support member 844 and the seat member mounting bracket 643 to each other. The guideway interface has an orientation in a direction athwart the released direction 697 with the seat member mounting bracket 643 fixing the support surface 244S in a predetermined reference orientation (as described herein), and seat member mounting bracket 643 has the pivot axis 696 to reorient the guideway interface down at least in part from the cantilevered weight of the support member 844.

Figures 6A, 6B:
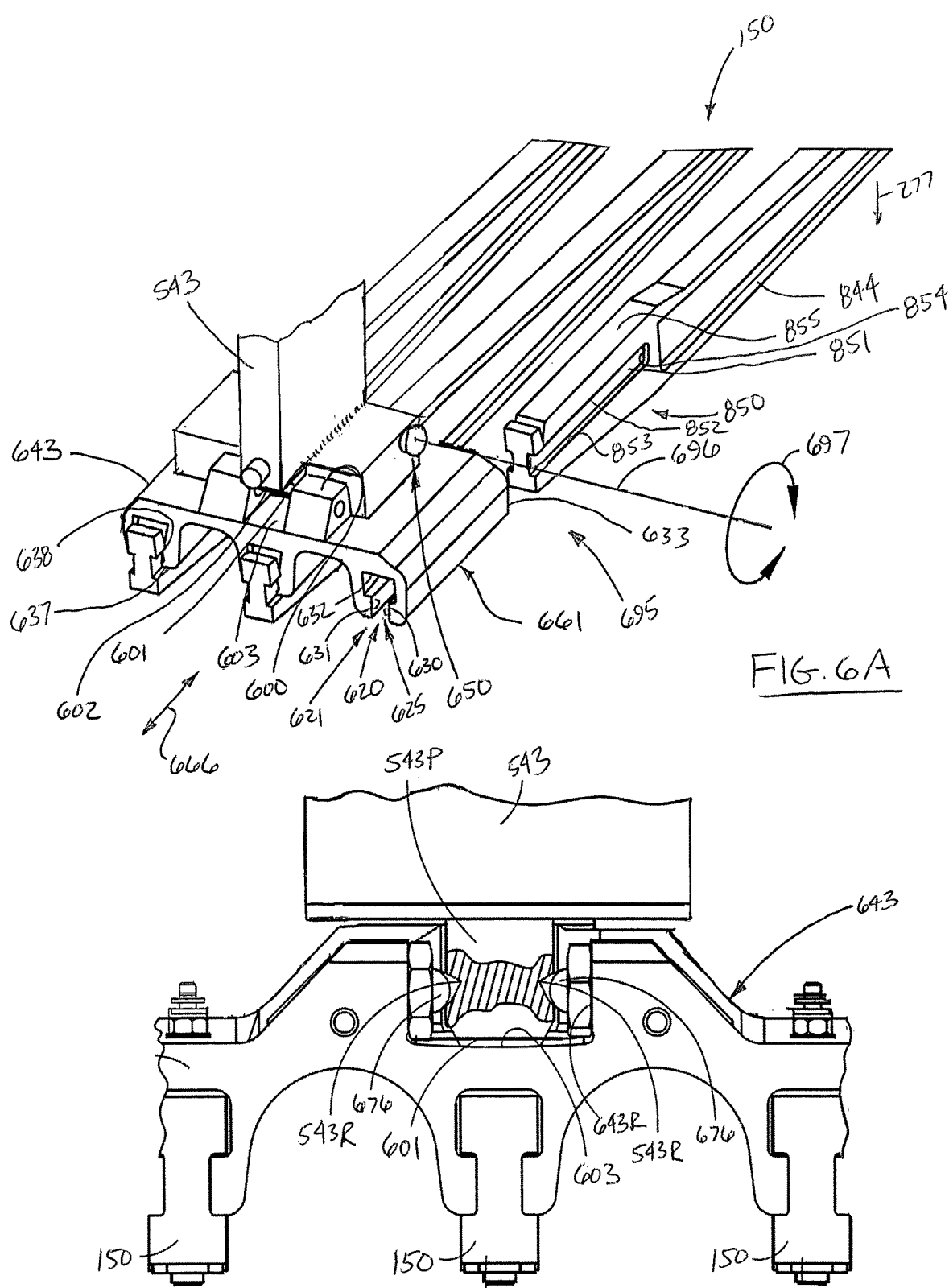
FIGS. 6A and 6B are exemplary illustrations of a portion of the depalletizing tool of FIG. 1A in accordance with aspects of the disclosed embodiment.

The guideway interface has a reference datum disposed so as to define the predetermined reference orientation of the support surface 244S substantially coincident with joining of the support member 844 and the seat member mounting bracket 643. As can be seen in FIG. 6A, the guideway interface of the slot joint 621 includes a channel 625 that is sized and shaped to receive the base (or proximal) end 150PFB of the support member 844. The channel 625 may have any suitable configuration, such as for example, a T-shape, a V-shape, or other suitable shape configured to receive and locate the support member 844 in the predetermined reference orientation. In this aspect, the base end 150PFB of the support member 844 is shown as having (for illustrative purposes only) lateral grooves 851 that are spaced from a locating surface 855 of the support member 844, where the lateral grooves 851 receive opposing protrusions 630, 631 of the channel 625. The reference datum is formed by the interface between the locating surface 855 and upper surface 632 of the channel 625 and/or the interface between one or more of the upper and lower surfaces 852, 853 of the lateral grooves 851 of the support member 844 and the respective upper and lower surfaces 637, 638 of the opposing protrusions 630, 631 of the channel 625. In one aspect, to provide for sliding insertion and removal of the support member 844 to and from the seat member mounting bracket 643, the guideway interface defines a running clearance between the support member 844 and the seat member mounting bracket 643 so the support member 844 and the seat member mounting bracket 643 slide substantially free relative to each other in coupling and decoupling.

Referring to FIGS. 6A, 8A, and 8B, in one aspect, the support member is fully seated or coupled to the seat member mounting bracket 643 where, for example, a stop surface 854 of one or more of the lateral grooves 851 contact a stop surface 633 of the opposing protrusions 630, 631; while in other aspect, any suitable surfaces may locate the support member 844 within the channel 625 in the sliding direction 666. In one aspect, the support member 844 is configured with a visual indicator that provides a visual indication that the support member 844 is fully seated within the channel 625. For example, the base end 150PFB of the support member 844 includes a laterally/transverse extending notch 866 that includes an apex 867. The support member 844 and the locating surfaces (e.g., in the sliding direction 666) described above may be arranged relative to each other such that upon fully seating or coupling of the support member 844 within the channel 625 of the seat member mounting bracket 643, the apex 867 is substantially aligned with a back or seat indicating surface 680 (see FIG. 8B) of the seat member mounting bracket 643. In other aspects, any suitable visual, aural, or other indication may be provided to indicate to an operator that the support member 844 is fully seating in seat member mounting bracket 643.

The slot joint interface 621 described above provides for tool-less (i.e., no tools needed) replacement of the support member 844 (and of the article unit seat member 150 formed by the one or more support member 844). The tool-less changing of the support member 844 occurs, as noted above, by sliding the "old" article unit seat member 150 out of the channel 625 and sliding a "replacement" article unit seat member 150 into the channel 625 from which the "old" article unit seta member 150 was removed. Replacement of the article unit seat member 150 may occur in about two minutes or less compared to a fork replacement time of about 15 minutes or more for a conventional end of arm palletizing tool. Removal of the "old" article unit seat member 150 may be further facilitated by tipping the depalletizing tool 120 (such as through suitable control of the robot arm 114) so that a cantilevered (or distal) end 150PFD of the support member 844 (distal end 150PFD of the article unit seat member 150) is pointed downwards (e.g., towards the floor) so that removal of the article unit seat member 150 may be a gravity assisted removal.

Figures 4A, 4B:
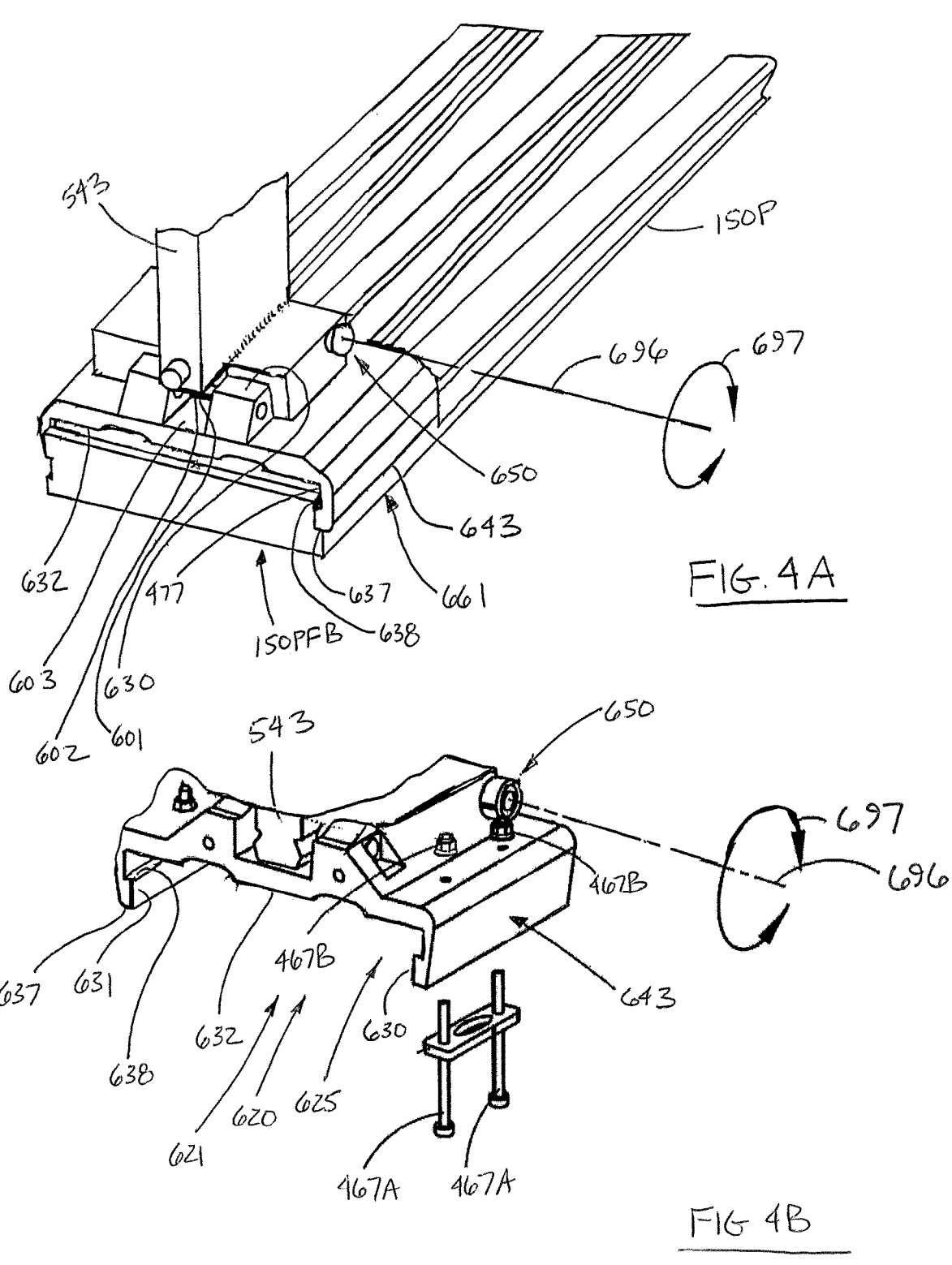
FIGS. 4A and 4B are exemplary illustrations of a portion of the depalletizing tool of FIG. 1A in accordance with aspects of the disclosed embodiment.

In other aspects, the support member 844 includes one or more apertures 901, 902 (see FIG. 9) employed to retain the support member 844 on the seat member mounting bracket 643. FIG. 4B illustrates a coupling where the article unit seat member 150 is retained in the post 543 with mechanical fasteners 467A, 467B, where the base 150PFB, 150PFB slides into the channel 625 of the seat member mounting bracket 643 of the post 543 and the mechanical fasteners 467A pass through the apertures 901, 902 of the base 150PFB, 150PFB for engagement with mechanical fasteners 467B.

Referring to FIGS. 2 and 4, the article unit seat member 150 is illustrated as one or more paddles or flaps 150P that may be substantially similar to the support members 844. Each of the flaps 150P have a frame 150 PF. The frame 150 PF may be skeletonized (e.g., includes cutouts, recesses, etc. so as to reduce the weight and amount of material to a minimum amount sufficient for supporting the case units transported by the depalletizing tool 120. The frame 150 PF includes a base portion or proximal end 150PFB that is coupled to the post 543 in any suitable manner such as with mechanical fasteners, weldments, chemical fastening, passive retention, etc. The flap 150P may be removable from the post 543 for replacement while, in other aspects, the flap 150P and post 543 may be a unitary member that is removed from the carriage 280CH as a unit for replacement. The frame 150 PF also includes a distal end 150PFD that is tapered in a manner described herein so as to be inserted between stacked case units CU and underneath a case unit CU transported by the depalletizing tool 120.

FIGS. 4, 4A, and 4B illustrate exemplary coupling configurations between the flap 150P and the post 543. In FIG. 4 the base 150PFB is coupled to the post 543 with mechanical fasteners such as bolts or screws where a surface of the flap 150P is abutted against a surface of the post 543 and the mechanical fasteners pass through the frame 150 PF into the post 543. FIG. 4A illustrates a coupling where the flap 150P is passively retained in the post 543 (e.g., as described with respect to FIG. 8B), where the base 150PFB slides into grooves 477 of the seat member mounting bracket 643 of the post 543 in a manner described herein. FIG. 4B illustrates a coupling where the flap 150P is retained in the post 543 with mechanical fasteners 467A, 467B, where the base 150PFB slides into channel 625 of the seat member mounting bracket 643 of the post 543 and the mechanical fasteners 467A pass through the base 150PFB for engagement with mechanical fasteners 467B.

Figure 7A:
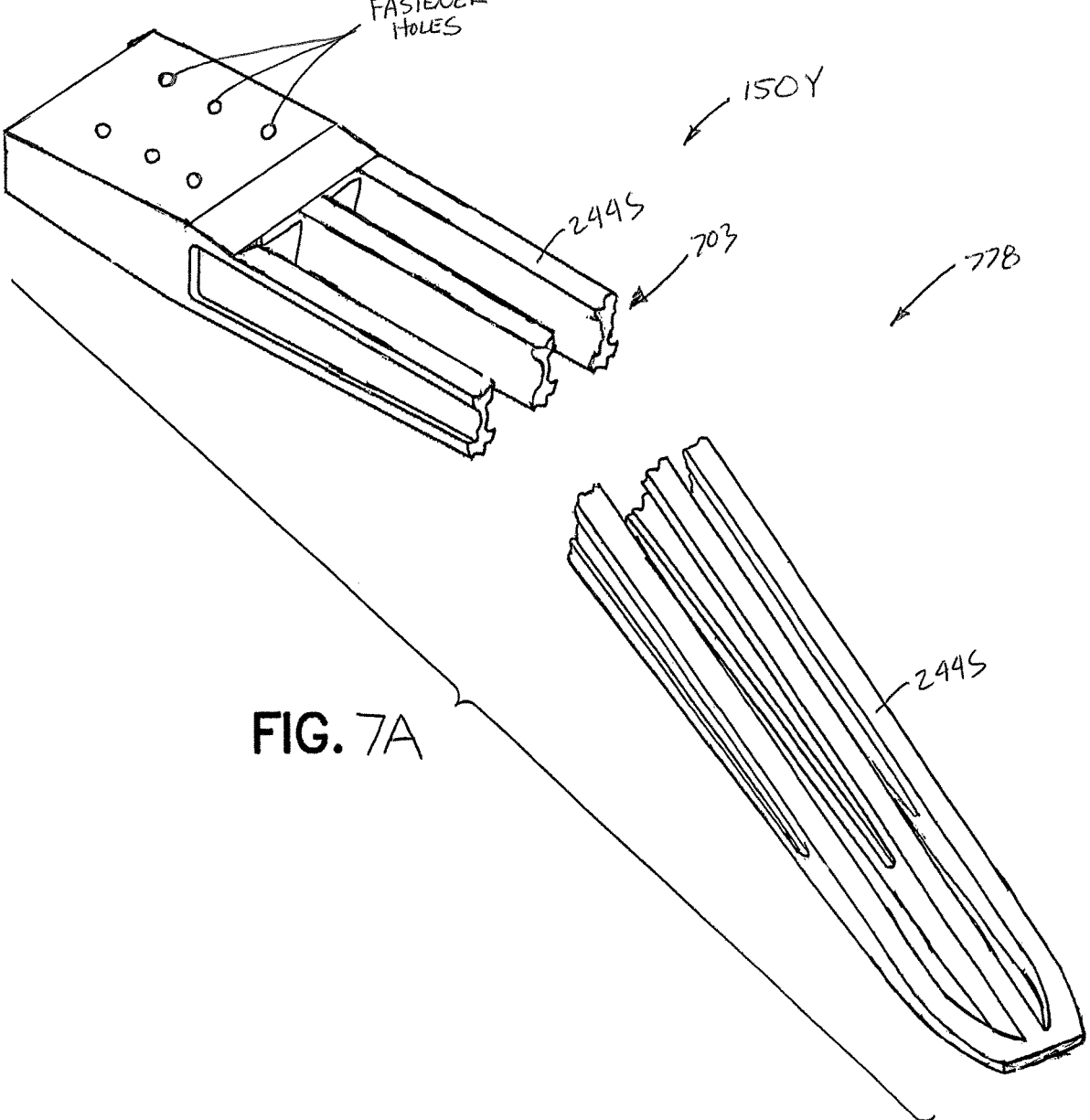
FIGS. 7A, 7B, and 7C are exemplary illustrations of a portion of the depalletizing tool of FIG. 1A in accordance with aspects of the disclosed embodiment.
Figure 7B:
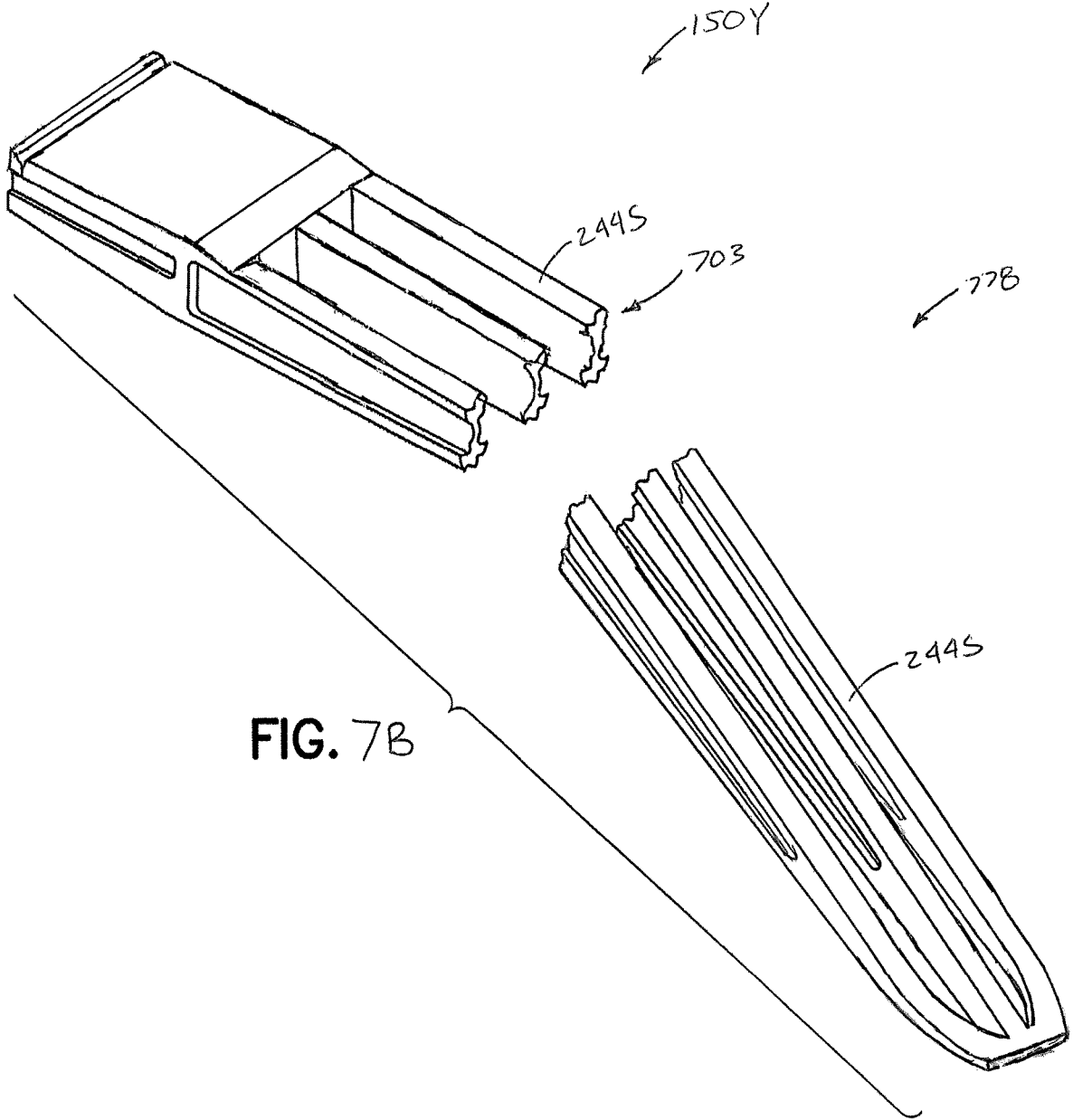
Figure 7C:
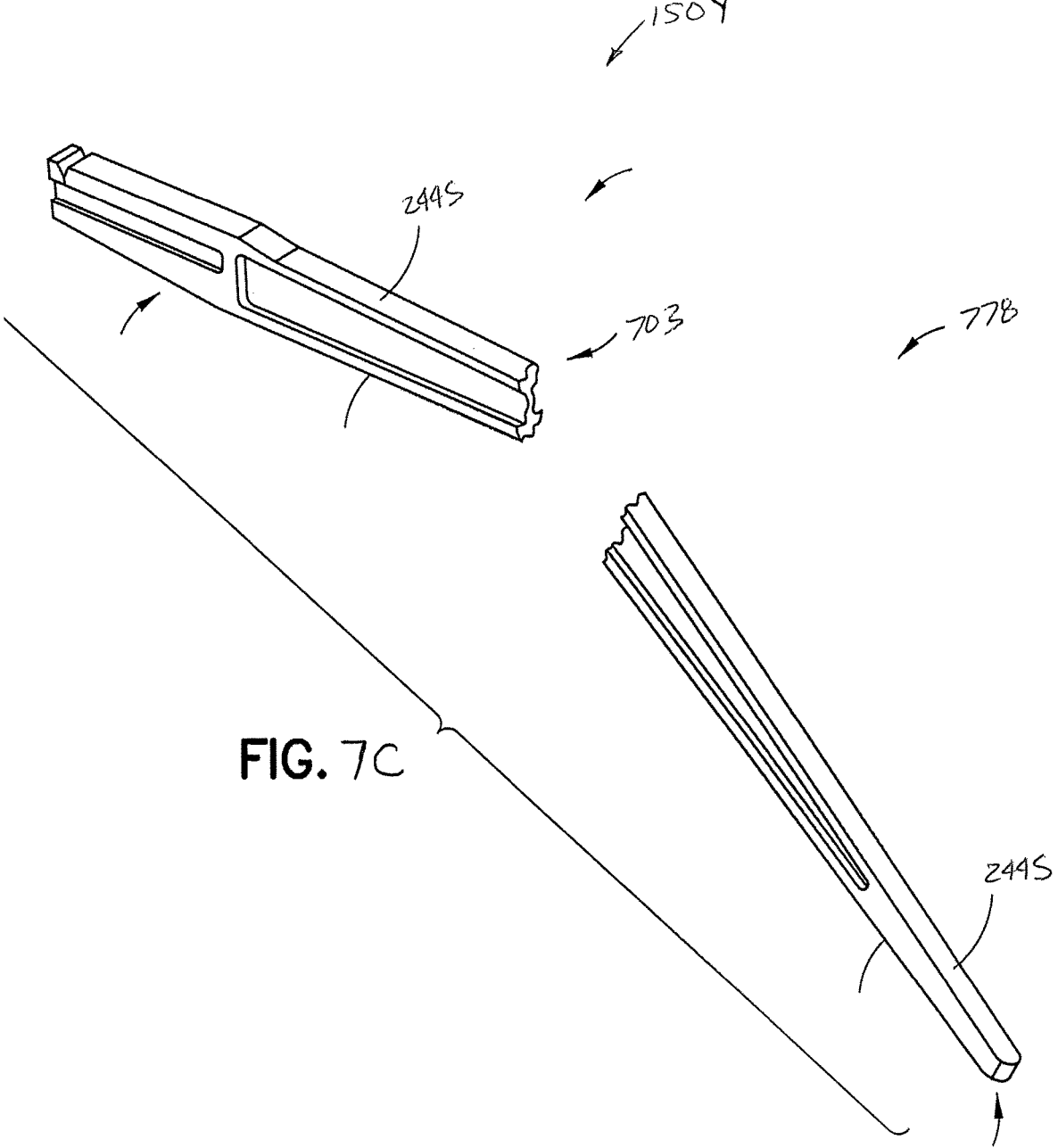
Figure 10:
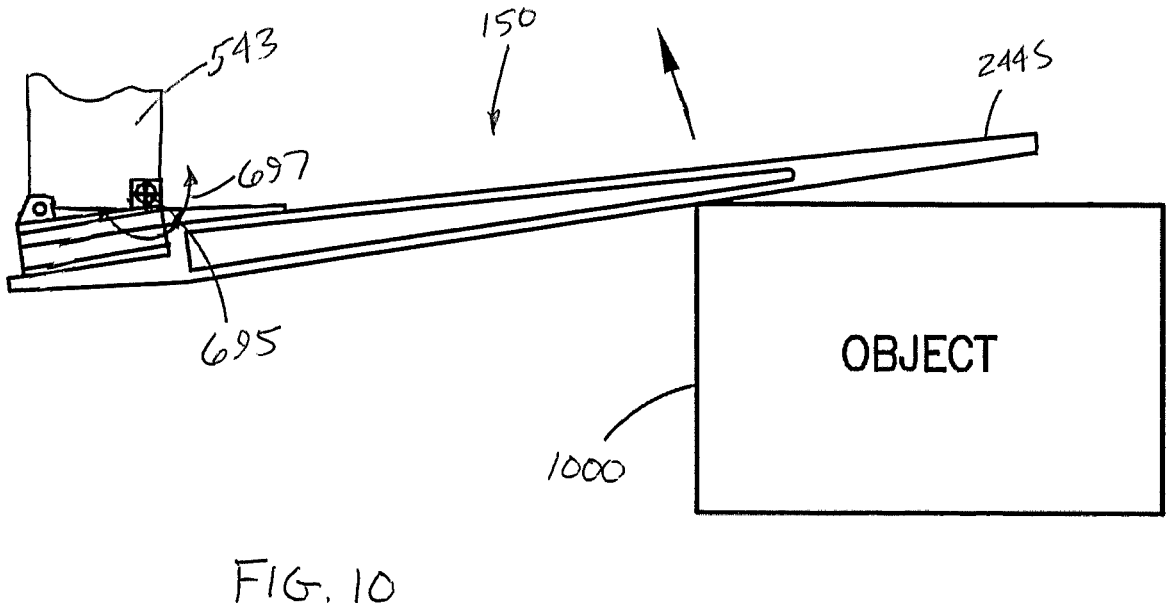
FIG. 10 is an exemplary illustration of compliant motion of a portion of the depalletizing tool of FIG. 1A in accordance with aspects of the disclosed embodiment.

Referring to FIGS. 1 and 7A-7C, in some aspects, the article unit seat member 150 is a frangible article unit seat member 150Y (e.g., substantially similar to that described in U.S. patent application Ser. No. 17/805,318 filed on Jun. 3, 2022 and published as US 2022/0388163, the disclosure of which is incorporated herein by reference in its entirety) (but is otherwise substantially similar to article unit seat member 150 described above with respect to FIGS. 2, 4-4B, 6A-6B, and 8A-9, except where noted). FIG. 7A illustrates a frangible version of the article unit seat member 150 of FIG. 4; FIG. 7B illustrates a frangible version of the article unit seat member 150 of FIG. 4A; and FIG. 7C illustrates a frangible version of the article unit seat member 150 of FIGS. 8A-9. The frangible article unit seat member 150Y has an un-ductile material characterized in that the frangible article unit seat member 150Y is substantially undeformed and the support surface 244S is substantially invariant, from the predetermined reference orientation (such as described herein), from strikes of the article unit seat member 150 against an obstruction or object 1000 (FIG. 10) with the depalletizing tool 120 moved along one or more paths by the robot arm 114, and in that the frangible article unit seat member 150Y remains substantially undeformed, the support surface 244S substantially invariant, onto fracture of the frangible article unit seat member 150Y on impact with the obstruction or object 1000 that causes the fracture, which fracture disrupts the support surface 244S from the predetermined reference orientation, so as to provide the support surface 244S with but two states, a substantially invariant state 777 (as shown in FIGS. 2, 4, 8A, and 9) and a disrupted state 778 (as shown in FIGS. 7A-7C). The frangible article unit seat member 150Y fracture provides a predetermined, substantially immediate, indication or indicia 703 to an operator of the depalletizer 100 of disruption of the support surface 244S. For example, as shown in FIGS. 7A-7C a portion of the frangible support article unit seat member 150Y separates completely (or in other aspects, partially) from another portion of the frangible support member so as to visibly truncate or visibly create gaps in the support surface 244S. The predetermined indicia 743 substantially immediately identifies to the operator the disruption rendered the support surface 244S unsuitable for seating a case unit CU thereon. The frangible article unit seat member 150Y is configured so as to define the predetermined indicia 743 that provides the substantially immediate indication of the disrupted state 778, wherein the predetermined indicia 743 is intrinsic to fracture of the frangible article unit seat member 150Y. For example, the indicia 743 may be any suitable indicia such as a fractured surface, strands of material, or any other suitable visual indicia and/or aural indication that identifies a fracture. It is noted that the robot 114 may operate under bang-bang (max torque, time optimal) control where the depalletizing tool 120 is moved by the robot 114 along any suitable transport paths at about 70% to about 90% of maximum robot 114 acceleration and at about 50% to about 60% maximum robot 114 jerk without a case unit CU held on the article unit seat 150. With a case unit CU held on the article unit seat member 150 the robot 114 may move the depalletizing tool 120 along the transport paths under bang-bang control at about 55% to about 85% of the maximum robot 114 acceleration and at about 50% to about 75% maximum robot 114 jerk. The article unit seat member 150 may encounter an object/obstruction 1000 (FIG. 10) during this bang-bang control movement and elastically deflect and remain invariant on striking objects and otherwise fracture as described herein. In some aspect, the frangible article unit seat member 150Y is configured so as to fracture on impact with the obstruction or object 1000 (FIG. 10) exceeding compliance of the coupling 695.

In one aspect, the frangible article unit seat member 150Y is configured so as to be substantially undeformed and the support surface 244S substantially invariant, from the predetermined reference orientation, from strikes of the article unit seat member 150Y and the obstruction or object 1000 (FIG. 10) with the depalletizing tool 120 moved along the transport path(s) by the robot 114 commensurate with the predetermined duty cycle of the robot 114 depalletizing pallets at the pallet unloading station 112. In one aspect, the frangible article unit seat member 150Y is configured so as to be substantially undeformed and the support surface 244S substantially invariant, from the predetermined reference orientation, from impacts of the article unit seat member 150Y and the obstruction or object 1000 (FIG. 10) with the depalletizing tool 120 moved along the transport path(s) by the robot 114 commensurate with optimum trajectory motion of the depalletizing tool 120 along the transport path(s) between different product pick and place positions (as illustrated in FIG. 1 such as picking from different locations on the pallet load PAL and placing at different positions on the case placement conveyor 126) of the depalletizing tool 120 in the depalletizer 100.

Referring again to FIGS. 1A-1C, 2 and 3, the grip assembly 130, the other grip assembly 140, and the article unit seat member 150 define a grip 189 of the depalletizing tool 120, with at least three degrees of freedom (the degrees of freedom being defined by the at least three motors 280A-280C of the drive section 280). The grip 189 effects capture and grip of the case unit CU. The grip 189 has grip modules 189M1, 189M2 (two or shown for exemplary purposes but in other aspects there may more than two grip modules), each with the at least three degrees of freedom, that define a selectably variable configuration between different selectable grip configurations GRPC1, GRPC2, GRPC3, GRPC4 (see FIGS. 2A-2D for illustrations of exemplary grip configurations as will be described herein) of the different (selectable) grip modules 189M1, 189M2, selected based on a size of the case unit CU, where each selectable grip configuration GRPC1, GRPC2, GRPC3, GRPC4 has the at least three degrees of freedom effecting capture and grip of the case unit CU.

The grip 189 has a symmetric configuration where the first grip module 189M1 and the second grip module 189M2 are symmetrically arranged relative to a centerline CL (see FIG. 2A) of the depalletizing tool 120. Each respective grip module 189M1, 189M2 includes at least a corresponding part 130F1, 130F2 of the grip assembly 130, a corresponding part 140F1, 140F2 of the other grip assembly 140, and a corresponding part 150A, 150B of the article unit seat member 150. Here, each grip module 189M1, 189M2 includes a grip assembly motor 280A1, 280A1 of the drive section 280 that drives a respective one of the corresponding parts 130F1, 130F2 of the grip assembly 130 in direction 299. Each grip module 189M1, 189M2 includes a grip assembly frame motor 280B1, 280B2 that drives the corresponding part 140F1, 140F2 of the other grip assembly 140 in direction 298. Each grip module 189M1, 189M2 includes an article unit seat member motor 280C1, 280C2 that drives the corresponding part 150A, 150B of the article unit seat member 150 in direction 298. As such, each of the first grip module 189M1 and the second grip module 189M2 include the three degrees of freedom effecting capture and grip of the case unit CU. As may be realized, each of the first grip module 189M and the second grip module 189M2 is independently actuable from each other so as to independently engage and grip a case unit CU based on a selected grip configuration GRPC1, GRPC2, GRPC3, GRPC4.

The grip configuration GRPC1 is an open grip configuration that effects capture and grip of a case unit with one or more of the grip assembly 130 and the other grip assembly 140.

The grip configuration GRPC2 is a closed/gripping grip configuration where grip module 189M2 grips a case unit CU and grip module 189M1 is free of case units CU. Here, the motor 280A2 moves the corresponding part 130F2 of the grip assembly 130 towards a case unit CU on the pallet load PAL. The motor 280B2 moves the corresponding part 140F2 of the other grip assembly 140 towards the case unit CU on the pallet load PAL. In some aspects, the grip assembly 130 may engage the case unit before the other grip assembly 140; in other aspects, the other grip assembly 140 may engage the case unit CU before the grip assembly 130; and in still other aspects, the grip assembly 130 and the other grip assembly 140 may engage the case unit CU substantially simultaneously. With the case unit gripped or otherwise engaged by one or more of the corresponding part 130F2 of the grip assembly 130 and the corresponding part 140F2 of the other grip assembly 140, the motor 280C2 moves the corresponding part 150B of the article unit seat member 150 underneath the case unit CU so as to grip the case unit CU where the gripped case unit CU is engaged at least on three sides TS, BS, SS (see, e.g., FIG. 1B) gripped by, and between, the corresponding parts 130F1, 140F2, 150B of the grip assembly 130, the other grip assembly 140, and the article unit seat member 150.

The grip configuration GRPC3 is a closed/gripping grip configuration where grip module 189M1 grips a case unit CU and grip module 189M2 is free of case units CU. Here, the motor 280A1 moves the corresponding part 130F1 of the grip assembly 130 towards a case unit CU on the pallet load PAL. The motor 280B1 moves the corresponding part 140F1 of the other grip assembly 140 towards the case unit CU on the pallet load PAL. In some aspects, the grip assembly 130 may engage the case unit before the other grip assembly 140; in other aspects, the other grip assembly 140 may engage the case unit CU before the grip assembly 130; and in still other aspects, the grip assembly 130 and the other grip assembly 140 may engage the case unit CU substantially simultaneously. With the case unit gripped or otherwise engaged by one or more of the corresponding part 130F1 of the grip assembly 130 and the corresponding part 140F1 of the other grip assembly 140, the motor 280C1 moves the corresponding part 150A of the article unit seat member 150 underneath the case unit CU so as to grip the case unit CU where the gripped case unit CU is engaged at least on three sides TS, BS, SS (see, e.g., FIG. 1B) gripped by, and between, the corresponding parts 130F1, 140F1, 150A of the grip assembly 130, the other grip assembly 140, and the article unit seat member 150.

The grip configuration GRPC4 is a closed/gripping grip configuration where both grip modules 189M1, 189M2 grip a common (i.e., the same) case unit CU. Here, the motors 280A1, 280A2 move the corresponding parts 130F1, 130F2 of the grip assembly 130 towards a case unit CU on the pallet load PAL. The motors 280B1, 280B2 move the corresponding parts 140F1, 140F2 of the other grip assembly 140 towards the case unit CU on the pallet load PAL. In some aspects, the grip assembly 130 may engage the case unit before the other grip assembly 140; in other aspects, the other grip assembly 140 may engage the case unit CU before the grip assembly 130; and in still other aspects, the grip assembly 130 and the other grip assembly 140 may engage the case unit CU substantially simultaneously. With the case unit gripped or otherwise engaged by one or more of the corresponding parts 130F1, 130F2 of the grip assembly 130 and the corresponding parts 140F1, 140F2 of the other grip assembly 140, the motors 280C1, 280C2 move the corresponding parts 150A, 150B of the article unit seat member 150 underneath the case unit CU so as to grip the case unit CU where the gripped case unit CU is engaged at least on three sides TS, BS, SS (see, e.g., FIG. 1B) gripped by, and between, the corresponding parts 130F1, 140F1, 150A of the grip assembly 130, the other grip assembly 140, and the article unit seat member 150.

Figure 11:
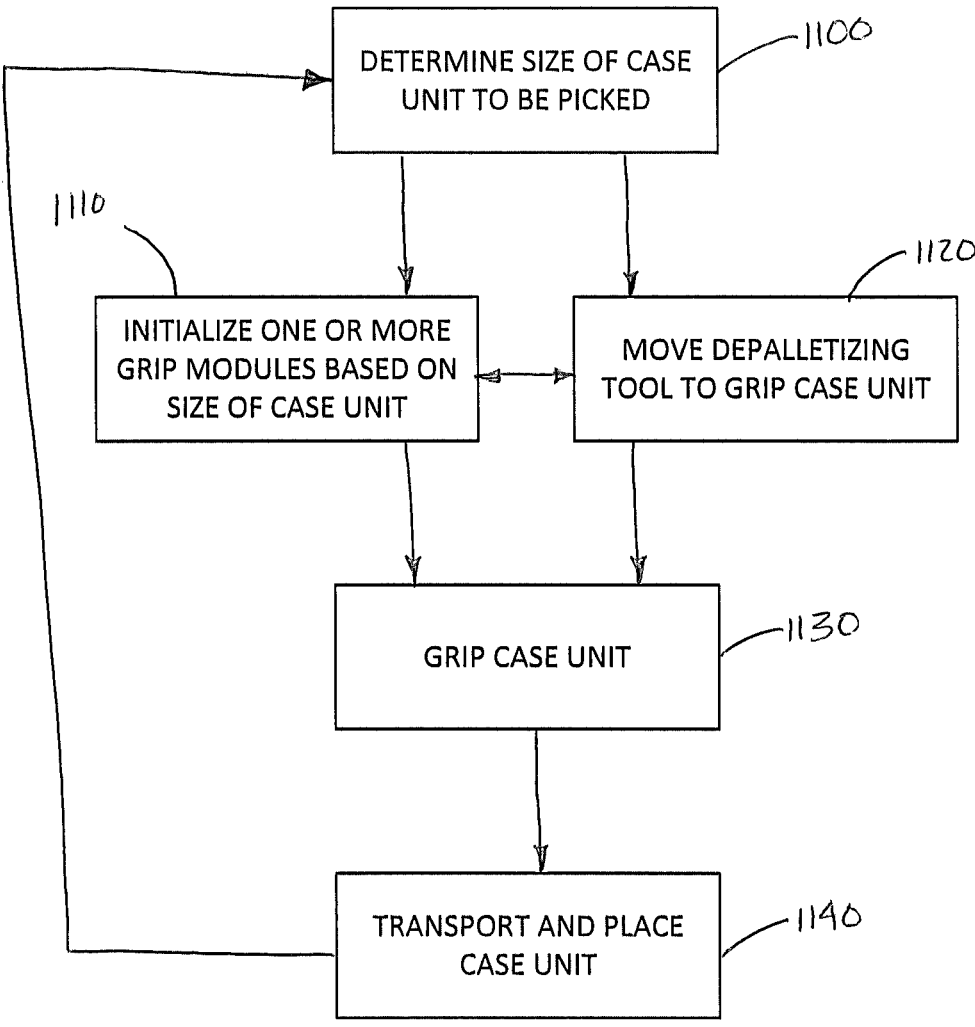
FIGS. 11, 12, and 13 are flow diagrams of exemplary methods in accordance with aspects of the disclosed embodiment.

As described herein, the depalletizing tool 120 includes drive section 280 and the controller 110C is communicably connected to the drive section 280 and the respective grip modules 189M1, 189M2. The controller 110C is programmed (e.g., with any suitable non-transitory computer program code) to effect selection of the selectable grip configuration GRPC1, GRPC2, GRPC3, GRPC4 based on the size of the case unit CU. For example, the selected grip configuration GRPC1, GRPC2, GRPC3, GRPC4 includes selecting (such as by the controller 110C), based on the size (e.g., length, width, and height) of the case unit CU, between initializing one of the respective grip module 189M1, 189M2 with the other grip module 189M1, 189M2 being uninitialized, and initializing both respective grip modules 189M1, 189M2 for actuation between gripping and ungripping positions (see, e.g., FIGS. 2A-2D) to grip the case unit CU corresponding to the selected grip configuration GRPC1, GRPC2, GRPC3, GRPC4. For example, the controller 110C determines the size of the case unit CU to be picked (FIG. 11, Block 1100) in any suitable manner. For example, one or more of the vision system 110V and known characteristics of the pallet load PAL (such as known from a reference pallet load build plan) may be employed to determine the size of the case unit to be picked. The controller 110C commands the robot 114 movement towards the case unit to be gripped (FIG. 11, Block 1120) and initializes one or more of the grip modules 189M1, 189M2 based on the determined size of the case unit CU (FIG. 11, Block 1110). It is noted that the initialization of one or more of the grip modules 189M1, 189M2 may be performed by the controller 110C prior to or substantially simultaneously with the robot 114 movement towards the case unit CU. The controller 110C commands operation of the drive section 280 of the depalletizing tool 120 so that the case unit is gripped (FIG. 11, Block 1130) as described herein where the gripped case unit CU is transported by the robot 114 and placed at any suitable location, such as the case placement conveyor 126. The pick place operation of the robot (e.g., Blocks 1100-1140 of FIG. 11) continues until there are no case units CU remaining in the pallet load PAL.

In one or more aspects, the movement of the grip assembly 130 in the direction 299 and the movement of the other grip assembly in the angled direction 298 is synchronized with a translation of the depalletizing tool 120. In one or more aspects movement of the article unit seat member 150 is synchronized with movement of one or more of the grip assembly 130 in direction 299 and the other grip assembly 140 in the angled direction 298. This synchronization is effected by the drive section 280 under control of controller 110C. For example, with picking of a case unit CU from the pallet load PAL, the other grip assembly 140 may be moved in direction 298 with movement of the depalletizing tool 120 in the same direction. With picking of the case unit CU from the pallet load PAL, the grip assembly 130 may be moved in direction 299 with movement of the depalletizing tool 120 in the same direction. Movement of one or more of the grip assembly 130 and the other grip assembly 140 in the same direction as depalletizing tool 120 movement may increase the speed of the pick. With placement of the case unit at the case placement conveyor, the other grip assembly 140 may be moved in direction 298 opposite a direction of palletizing tool 120 movement so as to keep the case unit CU being placed substantially stationary relative to the case placement conveyor 126 as the palletizing tool moves away from the case unit. The movement of the other grip assembly 140 may also be synchronized with the movement of the article unit seat member in direction 298 such that the other grip assembly 140 and the article unit seat member are moved in the same (retraction) direction at different rates (e.g., so that the side BS of the case unit is released before the side SS of the case unit) or in different directions (e.g., the article unit seat member 150 is retracted in direction 298 while the other grip assembly 140 is extended in direction 298 so as to maintain the case unit substantially stationary relative to the case placement conveyor 126 and to speed up placement of the case unit).

Figure 12:
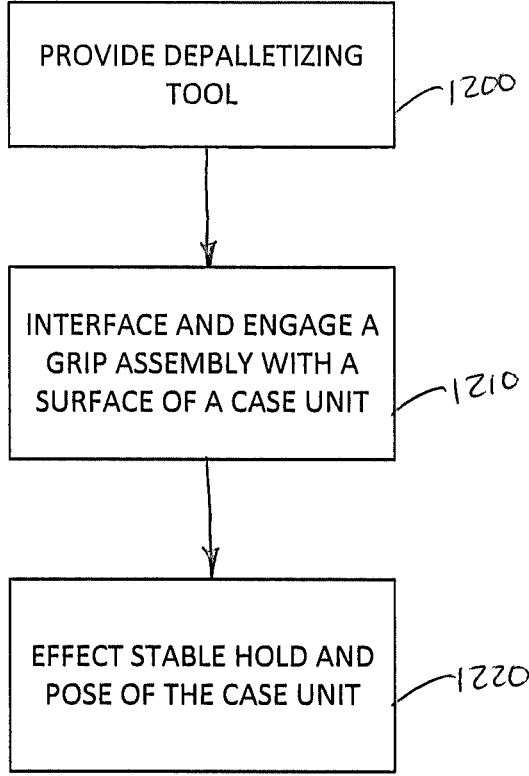
Figure 13:
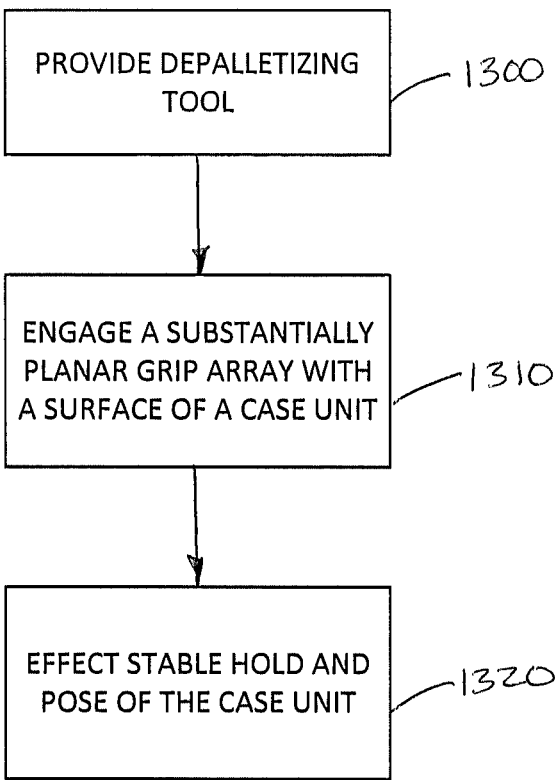

Referring to FIGS. 1A-5 and 12, an exemplary depalletizing method will be described in accordance with aspects of the disclosed embodiment. The depalletizing tool 120 is provided (FIG. 12, Block 1200) having the features described herein. The grip assembly 130 is interfaced and engaged with a surface TS of a case unit CU (FIG. 12, Block 1210). As described herein, the surface TS is substantially facing the direction 299, wherein the grip assembly 130 is movable, relative to the frame 120F, in the direction 299 between gripping and ungripping positions. The other grip assembly 140, in combination with the grip assembly 130 effects stable hold and pose of the case unit CU (FIG. 12, Block 1220) in a predetermined position, with respect to the frame 120F, substantially upon contact with the case unit CU. As described herein, the hold of the case unit CU by the grip assembly 130 and the other grip assembly 140 secures the case unit CU in the predetermined position against sliding seating contact of the article unit seat member 150 against the case unit CU. Picking and transport of the case unit CU may occur in a manner substantially similar to that described with respect to FIG. 11.

Referring to FIGS. 1A-5 and 13, an exemplary depalletizing method will be described in accordance with aspects of the disclosed embodiment. The depalletizing tool 120 is provided (FIG. 13, Block 1300) having the features described herein. The substantially planar grip array 130 is engaged, in the first direction 299, with an area of the pallet load article unit CU surface TS facing the first direction (FIG. 13, Block 1310), where the substantially planar grip array 130 is movable, relative to the frame 120F, in the first direction 299 between gripping and ungripping positions. As noted herein, the substantially planar grip array 130, in some aspects, is configured to contour to a surface 1400 (see FIG. 14) of the pallet load article unit CU. Stable hold and pose of the pallet load article unit is effected (FIG. 13, Block 1320), with the substantially linear grip array 140 in combination with the substantially planar grip array 130, with respect to the frame 120F substantially upon contact with the pallet load article unit CU. The hold of the pallet load article unit CU by the substantially planar grip array 130 and substantially liner grip array 140 secures the pallet load article unit CU in the predetermined position against dislodgement from moving the article unit seat member 150 against the pallet load article unit CU.

Referring to FIGS. 1A-2, 15, and 16, the aspects of the disclosed embodiment may provide for movement of the article unit seat member 150 in direction 299 for gripping a case unit CU (e.g., pushing, squeezing, or otherwise lifting a case unit) against the vacuum grippers 130SG of the pneumatic array 130PA. In some aspects (see FIG. 15), where the article unit seat member 150 is configured with pivot axis 696 as described with respect to FIGS. 4A, 4B, 6A, 6B and 10, the depalletizing tool 120 is configured to grip the case unit by pivoting the article unit seat member 150. For example, the frame 120F includes a cam 1511 having a cam surface 1511S and the article unit seat member 150 includes a cam follower 1510 having a follower surface 1510S. With extension of the article unit sear member 150 in direction 298 (e.g., to position the article unit seat member underneath a case unit CU) the follower surface 1510S engages or otherwise contacts the cam surface 1511S causing the article unit seat member 150 to pivot about pivot axis 696 in direction 697A by any suitable angular distance θ that effects gripping the case unit CU. In other aspects (see FIG. 16), with the article unit seat member configured with the pivot axis 696 or without the pivot axis 696, the article unit seat member 150 may be moved in direction 299U in any suitable manner. For example, the drive section 280 may include a seat member grip drive 280D that is coupled to the frame 120F and the article unit seat member 150 in any suitable manner, and configured to move the article unit seat member 150 in direction 299. The seat member grip drive 280D may be any suitable linear drive including, but not limited to, pneumatic drives and electric drives or actuators. With the article unit seat member 150 extended underneath a case unit CY, the seat member grip drive 280D moves the article unit seat member 150 in direction 299U by any suitable distance GD that effects gripping the case unit CU.

In accordance with one or more aspects of the disclosed embodiment a tool for depalletizing mixed pallet load article units is provided. The tool includes a frame for mounting the tool to a robot; a first grip assembly, movably connected to the frame, and having a grip face with a predetermined orientation defining a substantially plane grip interface in a first direction interfacing and engaging with a surface of a pallet load article unit, the surface substantially facing the first direction, wherein the first grip assembly is movable, relative to the frame, in the first direction between gripping and ungripping positions; a second grip assembly, movably connected to the frame, and with at least a grip contact point oriented to interface with and generate a grip force, on another surface of the pallet load article unit, in a direction angled to the first direction, the second grip assembly being movable substantially in the angled direction and configured so as to effect, in combination with the first grip assembly, stable hold and pose of the pallet load article unit in a predetermined position, with respect to the frame, substantially upon contact with the pallet load article unit; and an article unit seat member, movably mounted to the frame, and disposed in opposition to at least one of the first grip assembly and the second grip assembly, wherein the hold of the pallet load article unit by the first grip assembly and the second grip assembly secures the pallet load article unit in the predetermined position against sliding seating contact of the article unit seat member against the pallet load article unit.

In accordance with one or more aspects of the disclosed embodiment the article unit seat member is movable, relative to the frame, between seated and unseated positions, wherein in the seated position the article unit seat member is seated against still another surface of the pallet load article unit.

In accordance with one or more aspects of the disclosed embodiment the tool further includes a drive section with at least three degrees of freedom operably coupled to each of the first grip assembly, the second grip assembly, and article unit seat member, with at least one corresponding degree of freedom connected respectively to and so that each of the first grip assembly, the second grip assembly, and the article unit seat member are independently actuable from each other.

In accordance with one or more aspects of the disclosed embodiment the first grip assembly, the second grip assembly, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

In accordance with one or more aspects of the disclosed embodiment the grip has a symmetric configuration with a first grip module and a second grip module, each respective grip module including at least a corresponding part of the first grip assembly, the second grip assembly, and the article unit seat member.

In accordance with one or more aspects of the disclosed embodiment the respective grip module is independently actuable from each other grip module so as to independently engage and grip the pallet load article unit based on a selected grip configuration.

In accordance with one or more aspects of the disclosed embodiment the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

In accordance with one or more aspects of the disclosed embodiment the tool further includes a drive section; and a controller communicably connected to the drive section and the respective grip modules, and the controller being programmed to effect selection of the selectable grip configuration based on the size of the pallet load article unit.

In accordance with one or more aspects of the disclosed embodiment the first grip assembly has as a first pneumatic array, and the second grip assembly has a second pneumatic array.

In accordance with one or more aspects of the disclosed embodiment one or more of the movement of the first grip assembly in the first direction and the movement of the second grip assembly in the angled direction is synchronized with a translation of the tool.

In accordance with one or more aspects of the disclosed embodiment the tool further includes a drive section coupled to a controller of the robot, the drive section is configured to effect synchronization of movement of the article unit seat member with one or more of the movement of the first grip assembly in the first direction and the movement of the second grip assembly in the angled direction.

In accordance with one or more aspects of the disclosed embodiment a method for depalletizing mixed pallet load article units is provided. The method includes providing a tool having: a frame for mounting the tool to a robot, a first grip assembly, movably connected to the frame, and having a grip face with a predetermined orientation defining a substantially plane grip interface in a first direction, a second grip assembly, movably connected to the frame, and with at least a grip contact point oriented to interface with and generate a grip force, on another surface of the pallet load article unit, in a direction angled to the first direction, the second grip assembly being movable substantially in the angled direction, and an article unit seat member, movably mounted to the frame, and disposed in opposition to at least one of the first grip assembly and the second grip assembly; interfacing and engaging the first grip assembly with a surface of a pallet load article unit, the surface substantially facing the first direction, wherein the first grip assembly is movable, relative to the frame, in the first direction between gripping and ungripping positions; and effecting with the second grip assembly, in combination with the first grip assembly, stable hold and pose of the pallet load article unit in a predetermined position, with respect to the frame, substantially upon contact with the pallet load article unit; wherein the hold of the pallet load article unit by the first grip assembly and the second grip assembly secures the pallet load article unit in the predetermined position against sliding seating contact of the article unit seat member against the pallet load article unit.

In accordance with one or more aspects of the disclosed embodiment the article unit seat member is movable, relative to the frame, between seated and unseated positions, wherein in the seated position the article unit seat member is seated against still another surface of the pallet load article unit.

In accordance with one or more aspects of the disclosed embodiment the method further includes independently actuating each of the first grip assembly, the second grip assembly, and the article unit seat member, independent of each other, with at least one corresponding degree of freedom of a drive section of the tool where the drive section has at least three degrees of freedom operably coupled to each of the first grip assembly, the second grip assembly, and article unit seat member.

In accordance with one or more aspects of the disclosed embodiment the first grip assembly, the second grip assembly, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

In accordance with one or more aspects of the disclosed embodiment the grip has a symmetric configuration with a first grip module and a second grip module, each respective grip module including at least a corresponding part of the first grip assembly, the second grip assembly, and the article unit seat member.

In accordance with one or more aspects of the disclosed embodiment the respective grip module is independently actuable from each other grip module so as to independently engage and grip the pallet load article unit based on a selected grip configuration.

In accordance with one or more aspects of the disclosed embodiment the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

In accordance with one or more aspects of the disclosed embodiment the method further includes providing the tool with a drive section and a controller communicably coupled to the drive section and the respective grip modules; and effecting, with the controller, selection of the selectable grip configuration based on the size of the pallet load article unit.

In accordance with one or more aspects of the disclosed embodiment the first grip assembly has as a first pneumatic array, and the second grip assembly has a second pneumatic array.

In accordance with one or more aspects of the disclosed embodiment one or more of the movement of the first grip assembly in the first direction and the movement of the second grip assembly in the angled direction is synchronized with a translation of the tool.

In accordance with one or more aspects of the disclosed embodiment the method further includes providing a drive section coupled to a controller of the robot, and effecting, with the drive section, synchronization of movement of the article unit seat member with one or more of the movement of the first grip assembly in the first direction and the movement of the second grip assembly in the angled direction.

In accordance with one or more aspects of the disclosed embodiment a depalletizing cell includes: an infeed conveyor for providing a mixed pallet load to be depalletized; a pallet unloading station; and a robot equipped with a tool for depalletizing mixed pallet load article units from the mixed pallet load disposed at the pallet unloading station, the tool includes: a frame for mounting the tool to a robot; a first grip assembly, movably connected to the frame, and having a grip face with a predetermined orientation defining a substantially plane grip interface in a first direction interfacing and engaging with a surface of a pallet load article unit, the surface substantially facing the first direction, wherein the first grip assembly is movable, relative to the frame, in the first direction between gripping and ungripping positions; a second grip assembly, movably connected to the frame, and with at least a grip contact point oriented to interface with and generate a grip force, on another surface of the pallet load article unit, in a direction angled to the first direction, the second grip assembly being movable substantially in the angled direction and configured so as to effect, in combination with the first grip assembly, stable hold and pose of the pallet load article unit in a predetermined position, with respect to the frame, substantially upon contact with the pallet load article unit; and an article unit seat member, movably mounted to the frame, and disposed in opposition to at least one of the first grip assembly and the second grip assembly, wherein the hold of the pallet load article unit by the first grip assembly and the second grip assembly secures the pallet load article unit in the predetermined position against sliding seating contact of the article unit seat member against the pallet load article unit.

In accordance with one or more aspects of the disclosed embodiment the article unit seat member is movable, relative to the frame, between seated and unseated positions, wherein in the seated position the article unit seat member is seated against still another surface of the pallet load article unit.

In accordance with one or more aspects of the disclosed embodiment the tool of the depalletizing cell further incudes a drive section with at least three degrees of freedom operably coupled to each of the first grip assembly, the second grip assembly, and article unit seat member, with at least one corresponding degree of freedom connected respectively to and so that each of the first grip assembly, the second grip assembly, and the article unit seat member are independently actuable from each other.

In accordance with one or more aspects of the disclosed embodiment the first grip assembly, the second grip assembly, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

In accordance with one or more aspects of the disclosed embodiment the grip has a symmetric configuration with a first grip module and a second grip module, each respective grip module including at least a corresponding part of the first grip assembly, the second grip assembly, and the article unit seat member.

In accordance with one or more aspects of the disclosed embodiment the respective grip module is independently actuable from each other grip module so as to independently engage and grip the pallet load article unit based on a selected grip configuration.

In accordance with one or more aspects of the disclosed embodiment the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

In accordance with one or more aspects of the disclosed embodiment the tool of the depalletizing cell further includes: a drive section; and a controller communicably connected to the drive section and the respective grip modules, and the controller being programmed to effect selection of the selectable grip configuration based on the size of the pallet load article unit.

In accordance with one or more aspects of the disclosed embodiment the first grip assembly has as a first pneumatic array, and the second grip assembly has a second pneumatic array.

In accordance with one or more aspects of the disclosed embodiment one or more of the movement of the first grip assembly in the first direction and the movement of the second grip assembly in the angled direction is synchronized with a translation of the tool.

In accordance with one or more aspects of the disclosed embodiment the tool of the depalletizing cell further includes a drive section coupled to a controller of the robot, the drive section is configured to effect synchronization of movement of the article unit seat member with one or more of the movement of the first grip assembly in the first direction and the movement of the second grip assembly in the angled direction.

In accordance with one or more aspects of the disclosed embodiment tool for depalletizing mixed pallet load article units is provided. The tool includes: a frame for mounting the tool to a robot; a substantially planar grip array, movably connected to the frame, and having a grip face with a predetermined orientation defining a grip interface interfacing and engaging, in a first direction, an area of a pallet load article unit surface substantially facing the first direction, wherein the substantially planar grip array is movable, relative to the frame, in the first direction between gripping and ungripping positions; a substantially linear grip array, movably connected to the frame, and with at least a grip contact point oriented to interface with and generate a grip force, against a different surface of the article unit, in a direction angled to the first direction, the substantially linear grip array effecting, in combination with the substantially planar grip array, stable hold and pose of the pallet load article unit in a predetermined position, with respect to the frame, substantially upon contact with the pallet load article unit; and an article unit seat member, movably mounted to the frame, and opposed to at least one of the substantially planar grip array and the substantially linear grip array, wherein the hold of the pallet load article unit by the substantially planar grip array and the substantially liner grip array secures the pallet load article unit in the predetermined position against dislodgement from moving the article unit seat member against the pallet load article unit.

In accordance with one or more aspects of the disclosed embodiment the grip interface defined by the grip face, of the substantially planar grip array, has a substantially plane grip interface shape.

In accordance with one or more aspects of the disclosed embodiment the substantially planar grip array and the substantially linear grip array are movable substantially in the angled direction relative to each other, and the relative motion brings at least one of the substantially planar grip array and substantially linear grip array to contact the pallet load article unit.

In accordance with one or more aspects of the disclosed embodiment the article unit seat member is movable, relative to the frame, between seated and unseated positions, wherein in the seated position the article unit seat member is seated against still another surface of the pallet load article unit.

In accordance with one or more aspects of the disclosed embodiment the tool further includes a drive section with at least three degrees of freedom operably coupled to each of the substantially planar grip array, the substantially linear grip array, and the article unit seat member, with at least one corresponding degree of freedom connected respectively to and so that each of the substantially planar grip array, the substantially linear grip array, and the article unit seat member are independently actuable from each other.

In accordance with one or more aspects of the disclosed embodiment the substantially planar grip array, the substantially linear grip array, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

In accordance with one or more aspects of the disclosed embodiment the grip has a symmetric configuration with a first grip module and a second grip module, each respective grip module including at least a corresponding part of the substantially planar grip array, the substantially linear grip array, and the article unit seat member.

In accordance with one or more aspects of the disclosed embodiment the respective grip module is independently actuable from each other grip module so as to independently engage and grip the pallet load article unit based on a selected grip configuration.

In accordance with one or more aspects of the disclosed embodiment the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

In accordance with one or more aspects of the disclosed embodiment the tool further includes: a drive section; and a controller communicably connected to the drive section and the respective grip modules, and the controller being programmed to effect selection of the selectable grip configuration based on the size of the pallet load article unit.

In accordance with one or more aspects of the disclosed embodiment the substantially planar grip array has as a substantially planar pneumatic array, and the substantially linear grip array has a substantially linear pneumatic array.

In accordance with one or more aspects of the disclosed embodiment one or more of the movement of the substantially planar grip array in the first direction and the movement of the substantially linear grip array in the angled direction is synchronized with a translation of the tool.

In accordance with one or more aspects of the disclosed embodiment the tool of the depalletizing cell further includes a drive section coupled to a controller of the robot, the drive section is configured to effect synchronization of movement of the article unit seat member with one or more of the movement of the substantially planar grip array in the first direction and the movement of the substantially linear grip array in the angled direction.

In accordance with one or more aspects of the disclosed embodiment a method for depalletizing mixed pallet load article units is provided. The method includes: providing a tool having: a frame for mounting the tool to a robot, a substantially planar grip array, movably connected to the frame, and having a grip face with a predetermined orientation defining a grip interface interfacing, a substantially linear grip array, movably connected to the frame, and with at least a grip contact point oriented to interface with and generate a grip force, against a different surface of the article unit, in a direction angled to the first direction, and an article unit seat member, movably mounted to the frame, and opposed to at least one of the substantially planar grip and substantially linear grip array; engaging, with the substantially planar grip array, in a first direction, an area of a pallet load article unit surface substantially facing the first direction, wherein the substantially planar grip array is movable, relative to the frame, in the first direction between gripping and ungripping positions; and effecting, with the substantially linear grip array in combination with the substantially planar grip array, stable hold and pose of the pallet load article unit in a predetermined position, with respect to the frame, substantially upon contact with the pallet load article unit; wherein, the hold of the pallet load article unit by the substantially planar grip array and the substantially liner grip array secures the pallet load article unit in the predetermined position against dislodgement from moving the article unit seat member against the pallet load article unit.

In accordance with one or more aspects of the disclosed embodiment the grip interface defined by the grip face, of the substantially planar grip array, has a substantially plane grip interface shape.

In accordance with one or more aspects of the disclosed embodiment the substantially planar grip array and the substantially linear grip array are movable substantially in the angled direction relative to each other, and the relative motion brings at least one of the substantially planar grip array and substantially linear grip array to contact the pallet load article unit.

In accordance with one or more aspects of the disclosed embodiment the article unit seat member is movable, relative to the frame, between seated and unseated positions, wherein in the seated position the article unit seat member is seated against still another surface of the pallet load article unit.

In accordance with one or more aspects of the disclosed embodiment the method further includes providing the tool with a drive section, the drive section having at least three degrees of freedom operably coupled to each of the substantially planar grip array, the substantially linear grip array, and the article unit seat member, with at least one corresponding degree of freedom connected respectively to and so that each of the substantially planar grip array, the substantially linear grip array, and the article unit seat member are independently actuable from each other.

In accordance with one or more aspects of the disclosed embodiment the substantially planar grip array, the substantially linear grip array, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

In accordance with one or more aspects of the disclosed embodiment the grip has a symmetric configuration with a first grip module and a second grip module, each respective grip module including at least a corresponding part of the substantially planar grip array, the substantially linear grip array, and the article unit seat member.

In accordance with one or more aspects of the disclosed embodiment the respective grip module is independently actuable from each other grip module so as to independently engage and grip the pallet load article unit based on a selected grip configuration.

In accordance with one or more aspects of the disclosed embodiment the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

In accordance with one or more aspects of the disclosed embodiment the further includes: providing the tool with a drive section; and effecting selection, with a controller communicably connected to the drive section and the respective grip modules, of the selectable grip configuration based on the size of the pallet load article unit.

In accordance with one or more aspects of the disclosed embodiment the substantially planar grip array has as a substantially planar pneumatic array, and the substantially linear grip array has a substantially linear pneumatic array.

In accordance with one or more aspects of the disclosed embodiment one or more of the movement of the first grip assembly in the first direction and the movement of the second grip assembly in the angled direction is synchronized with a translation of the tool.

In accordance with one or more aspects of the disclosed embodiment the method further includes providing a drive section coupled to a controller of the robot, and effecting, with the drive section, synchronization of movement of the article unit seat member with one or more of the movement of the first grip assembly in the first direction and the movement of the second grip assembly in the angled direction.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. A tool for depalletizing mixed pallet load article units, the tool comprising:

a frame for mounting the tool to a robot;

a first grip assembly, movably connected to the frame, and having a grip face with a predetermined orientation defining a substantially plane grip interface in a first direction interfacing and engaging with a surface of a pallet load article unit, the surface substantially facing the first direction, wherein the first grip assembly is movable, relative to the frame, in the first direction between gripping and ungripping positions;

a second grip assembly, movably connected to the frame, and with at least a grip contact point oriented to interface with and generate a grip force, on another surface of the pallet load article unit, in a direction angled to the first direction, the second grip assembly being movable substantially in the angled direction and configured so as to effect, in combination with the first grip assembly, stable hold and pose of the pallet load article unit in a predetermined position, with respect to the frame, substantially upon contact with the pallet load article unit; and an article unit seat member, movably mounted to the frame, and disposed in opposition to at least one of the first grip assembly and the second grip assembly, wherein the hold of the pallet load article unit by the first grip assembly and the second grip assembly secures the pallet load article unit in the predetermined position against sliding seating contact of the article unit seat member against the pallet load article unit.

2. The tool of claim 1, wherein the article unit seat member is movable, relative to the frame, between seated and unseated positions, wherein in the seated position the article unit seat member is seated against still another surface of the pallet load article unit.

3. The tool of claim 1, further comprising a drive section with at least three degrees of freedom operably coupled to each of the first grip assembly, the second grip assembly, and the article unit seat member, with at least one corresponding degree of freedom connected respectively to and so that each of the first grip assembly, the second grip assembly, and the article unit seat member are independently actuable from each other.

4. The tool of claim 1, wherein the first grip assembly, the second grip assembly, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

5. The tool of claim 4, wherein the grip has a symmetric configuration with a first grip module and a second grip module, each respective grip module including at least a corresponding part of the first grip assembly, the second grip assembly, and the article unit seat member.

6. The tool of claim 5, wherein the respective grip module is independently actuable from each other grip module so as to independently engage and grip the pallet load article unit based on a selected grip configuration.

7. The tool of claim 6, wherein the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

8. The tool of claim 4, further comprising:

a drive section; and a controller communicably connected to the drive section and the respective grip modules, and the controller being programmed to effect selection of the selectable grip configuration based on the size of the pallet load article unit.

9. The tool of claim 1, wherein the first grip assembly has as a first pneumatic array, and the second grip assembly has a second pneumatic array.

10. A depalletizing cell comprising:

an infeed conveyor for providing a mixed pallet load to be depalletized;

a pallet unloading station; and a robot equipped with a tool for depalletizing mixed pallet load article units from the mixed pallet load disposed at the pallet unloading station, the tool comprising:

a frame for mounting the tool to a robot;

a first grip assembly, movably connected to the frame, and having a grip face with a predetermined orientation defining a substantially plane grip interface in a first direction interfacing and engaging with a surface of a pallet load article unit, the surface substantially facing the first direction, wherein the first grip assembly is movable, relative to the frame, in the first direction between gripping and ungripping positions;

a second grip assembly, movably connected to the frame, and with at least a grip contact point oriented to interface with and generate a grip force, on another surface of the pallet load article unit, in a direction angled to the first direction, the second grip assembly being movable substantially in the angled direction and configured so as to effect, in combination with the first grip assembly, stable hold and pose of the pallet load article unit in a predetermined position, with respect to the frame, substantially upon contact with the pallet load article unit; and an article unit seat member, movably mounted to the frame, and disposed in opposition to at least one of the first grip assembly and the second grip assembly, wherein the hold of the pallet load article unit by the first grip assembly and the second grip assembly secures the pallet load article unit in the predetermined position against sliding seating contact of the article unit seat member against the pallet load article unit.

11. The depalletizing cell of claim 10, wherein the article unit seat member is movable, relative to the frame, between seated and unseated positions, wherein in the seated position the article unit seat member is seated against still another surface of the pallet load article unit.

12. The depalletizing cell of claim 10, further comprising a drive section with at least three degrees of freedom operably coupled to each of the first grip assembly, the second grip assembly, and article unit seat member, with at least one corresponding degree of freedom connected respectively to and so that each of the first grip assembly, the second grip assembly, and the article unit seat member are independently actuable from each other.

13. The depalletizing cell of claim 10, wherein the first grip assembly, the second grip assembly, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

14. The depalletizing cell of claim 13, wherein the grip has a symmetric configuration with a first grip module and a second grip module, each respective grip module including at least a corresponding part of the first grip assembly, the second grip assembly, and the article unit seat member.

15. The depalletizing cell of claim 14, wherein the respective grip module is independently actuable from each other grip module so as to independently engage and grip the pallet load article unit based on a selected grip configuration.

16. The depalletizing cell of claim 15, wherein the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

17. The depalletizing cell of claim 13, further comprising:
   a drive section; and
   a controller communicably connected to the drive section and the respective grip modules, and the controller being programmed to effect selection of the selectable grip configuration based on the size of the pallet load article unit.

18. The depalletizing cell of claim 10, wherein the first grip assembly has as a first pneumatic array, and the second grip assembly has a second pneumatic array.

19. A tool for depalletizing mixed pallet load article units, the tool comprising:
   a frame for mounting the tool to a robot;
   a substantially planar grip array, movably connected to the frame, and having a grip face with a predetermined orientation defining a grip interface interfacing and engaging, in a first direction, an area of a pallet load article unit surface substantially facing the first direction, wherein the substantially planar grip array is movable, relative to the frame, in the first direction between gripping and ungripping positions;
   a substantially linear grip array, movably connected to the frame, and with at least a grip contact point oriented to interface with and generate a grip force, against a different surface of the pallet load article unit, in a direction angled to the first direction, the substantially linear grip array effecting, in combination with the substantially planar grip array, stable hold and pose of the pallet load article unit in a predetermined position, with respect to the frame, substantially upon contact with the pallet load article unit; and
   an article unit seat member, movably mounted to the frame, and opposed to at least one of the substantially planar grip array and the substantially linear grip array, wherein the hold of the pallet load article unit by the substantially planar grip array and the substantially liner grip array secures the pallet load article unit in the predetermined position against dislodgement from moving the article unit seat member against the pallet load article unit.

20. The tool of claim 19, wherein the grip interface defined by the grip face, of the substantially planar grip array, has a substantially plane grip interface shape.

21. The tool of claim 19, wherein the substantially planar grip array and the substantially linear grip array are movable substantially in the angled direction relative to each other, and the relative motion brings at least one of the substantially planar grip array and substantially linear grip array to contact the pallet load article unit.

22. The tool of claim 19, wherein the article unit seat member is movable, relative to the frame, between seated and unseated positions, wherein in the seated position the article unit seat member is seated against still another surface of the pallet load article unit.

23. The tool of claim 19, further comprising a drive section with at least three degrees of freedom operably coupled to each of the substantially planar grip array, the substantially linear grip array, and the article unit seat member, with at least one corresponding degree of freedom connected respectively to and so that each of the substantially planar grip array, the substantially linear grip array, and the article unit seat member are independently actuable from each other.

24. The tool of claim 19, wherein the substantially planar grip array, the substantially linear grip array, and the article unit seat member define a grip of the tool, with at least three degrees of freedom effecting capture and grip of the pallet load article unit, the grip having grip modules each with the at least three degrees of freedom, that define a selectably variable configuration between different selectable grip configurations of different selectable grip modules, selected based on a size of the pallet load article unit, wherein each selectable grip configuration having the at least three degrees of freedom effecting capture and grip of the pallet load article unit.

25. The tool of claim 24, wherein the grip has a symmetric configuration with a first grip module and a second grip module, each respective grip module including at least a corresponding part of the substantially planar grip array, the substantially linear grip array, and the article unit seat member.

26. The tool of claim 25, wherein the respective grip module is independently actuable from each other grip module so as to independently engage and grip the pallet load article unit based on a selected grip configuration.

27. The tool of claim 26, wherein the selected grip configuration includes selecting, based on the size of the pallet load article unit, between initializing one of the respective grip module with the other being uninitialized, and initializing both respective grip modules for actuation between gripping and ungripping positions to grip the pallet load article unit corresponding to the selected grip configuration.

28. The tool of claim 24, further comprising:
   a drive section; and
   a controller communicably connected to the drive section and the respective grip modules, and the controller being programmed to effect selection of the selectable grip configuration based on the size of the pallet load article unit.

29. The tool of claim 19, wherein the substantially planar grip array has as a substantially planar pneumatic array, and the substantially linear grip array has a substantially linear pneumatic array.

* * * * *